United States Patent
Nassimi

(12) 
(10) Patent No.: US 6,819,747 B2
(45) Date of Patent: Nov. 16, 2004

(54) SELF-CONTAINED DISTINCTIVE RING, VOICE, FACSIMILE, AND INTERNET DEVICE

(76) Inventor: Shary Nassimi, 2002 NW. 215 Crcl., Ridgefield, WA (US) 98642

( * ) Notice: Subject to any disclaimer, the term of this patent is extended or adjusted under 35 U.S.C. 154(b) by 0 days.

(21) Appl. No.: 10/210,258

(22) Filed: Jul. 31, 2002

(65) Prior Publication Data

US 2003/0161454 A1 Aug. 28, 2003

Related U.S. Application Data

(63) Continuation-in-part of application No. 10/084,730, filed on Feb. 26, 2002.

(51) Int. Cl.$^7$ ............................................. H04M 11/00
(52) U.S. Cl. ................................ 379/93.09; 379/93.11; 379/93.35
(58) Field of Search ........................... 379/90.01, 93.35, 379/93.11, 93.09, 93.05, 93.06, 93.07, 142.01, 142.07, 142.08, 142.13; 370/352

(56) References Cited

U.S. PATENT DOCUMENTS 6,298,122 B1 * 10/2001 Horne ...................... 379/93.09

FOREIGN PATENT DOCUMENTS

JP 411289573 A * 10/1999 ............ H04Q/7/22

OTHER PUBLICATIONS

Frise et al. ; Distinctive call Waoting alert and management device; Aug. 3, 1999; WO 99/39494.*

* cited by examiner

Primary Examiner—Melur Ramakrishnaiah
(74) Attorney, Agent, or Firm—Craig W. Barber

(57) ABSTRACT

The present invention provides a self-contained distinctive ring detection and utilization device for using a single telephone line to receive telephone calls and facsimiles and recognition of distinctive rings while being simultaneously connectable to the Internet that avoids the disadvantages of the prior art, and a self-contained device for using a single telephone line to receive telephone calls and facsimiles while being simultaneously connectable to the Internet that is simple to use. The present invention further provides a self-contained device using a single telephone line to receive telephone calls and facsimiles, while using distinctive ring features, while being simultaneously connectable to the Internet. The device includes a single housing, a facsimile jack connected to a facsimile machine, a telephone/answering machine jack connected to a telephone/answering machine, a modem jack connected to a computer, a telephone line jack connected to a telephone outlet, a microprocessor and tone detectors communicating with the microprocessor, a filter capable of distinguishing distinctive rings, telephone line isolation and input amplification and filtration communicating with, and between, the tone detectors and the telephone line jack, a tone select communicating with the tone detectors, display and ring buzzer communicating with the micro-processor, a ring voltage generator communicating with, and between, the display ring buzzer and the facsimile jack, a status detect (on/off hook) communicating with the micro-processor, control relays communicating with the status detect (on/off hook), and output drivers communicating with the micro-processor.

17 Claims, 32 Drawing Sheets

METHOD OF ASCERTAINING THAT CALL WAITING IS NOT DISABLED FOR WINDOW USERS

METHOD FOR ASCERTAINING THAT CALL WAITING IS NOT DISABLED FOR MAC USERS

METHOD OF MAKING THE SELF-CONTAINED DEVICE (10) WORK BETTER WITH THE COMPUTER (18) IF THE COMPUTER (18) DISCONNECTS AS SOON AS THE TELEPHONE/ANSWERING MACHINE (14) RINGS OR AS SOON AS THE TELEPHONE/ANSWERING MACHINE (14) IS ANSWERED

US 6,819,747 B2

SELF-CONTAINED DISTINCTIVE RING, VOICE, FACSIMILE, AND INTERNET DEVICE

CROSS-REFERENCE TO RELATED APPLICATIONS

This application is a continuation-in-part application of and claims the benefit of co-pending application Ser. No. 10/084730 filed on the date of Feb. 26, 2002, inventor Shary Nassimi, U.S. Pat. No. 6,665,381 and entitled "SELF-CONTAINED DEVICE USING A SINGLE PHONE LINE TO RECEIVE PHONE CALLS AND FACSIMILES WHILE CONNECTABLE TO THE INTERNET".

FIELD OF THE INVENTION

The present invention relates to a self-contained device for using a single telephone line to receive telephone calls and facsimiles using distinctive rings. More particularly, the present invention relates to a self-contained device for using a single telephone line to receive telephone calls and facsimiles and recognize and use distinctive ring call waiting signals while being simultaneously connectable to the Internet.

BACKGROUND OF THE INVENTION

Numerous innovations for telecommunication devices have been provided in the prior art that will be described. Even though these innovations may be suitable for the specific individual purposes to which they address, however, they differ from the present invention.

A FIRST EXAMPLE, U.S. Pat. No. 4,639,553 to Kiguchi teaches a facsimile communication system wherein a call signal detecting device is for identifying call signals which are received over a network. Both an unsounding call signal and a sounding call signal are detected by a single detection circuitry, which is also responsive to off-hooking of an own station's telephone set. Detection of such signals is implemented by the measurement of a period which is performed by a processing unit, so that changes in the specifications of the signals to be detected can be accommodated merely by modifying a program of the processing system and not the hardware of the device.

A SECOND EXAMPLE, U.S. Pat. No. 4,856,049 to Streck teaches apparatus for answering an incoming call over a single telephone line and for automatically switching the call between a telephone and a carrier signal-based device as appropriate. There is a three position switch for switching a telephone line connected thereto between first, second and third output positions thereof. The switch has the telephone operably connected to the second output position thereof and the carrier signal-based device connected to the third output position thereof. There is first logic having an input connected to the first output position of the switch and an output operably connected to switch the switch between the first, second and third output positions for answering an incoming call on the telephone line, for determining whether the incoming call is from a carrier signal-based device, for switching the switch to connect the second output position when an incoming call from a non-carrier signal-based device is detected, and for switching the switch to connect the third output position when an incoming call from a carrier signal-based device is detected. There is also second logic having an input connected to sense transmissions from the telephone and the carrier signal-based device and an output operably connected to switch the switch between the first, second and third output positions for switching the switch to the first position when a hang up by the telephone or the carrier signal-based device is detected. The preferred embodiment also senses a pickup by either device and automatically switches the switch to connect the device to the telephone line for outgoing transmission use. The preferred stand alone version also includes telephone answering capability for alerting a caller to its operation and for recording a message if the telephone is not answered.

A THIRD EXAMPLE, U.S. Pat. No. 5,003,581 to Pittard teaches a control and switching unit used with at least two devices for transmitting information or voice communication over telephone lines. The control and switching unit is provided with a series of relay to ensure that only one of the devices receives or transmits information at any one time. A timing circuit is utilized such that if one of the devices is a telephone, the second device would not be able to gain access to the telephone line if the telephone is ringing. Additionally, if the telephone is in use, the secondary device, such as a modem, could be selected and this secondary device would gain access to the telephone line after the use of the telephone has been discontinued.

A FOURTH EXAMPLE, U.S. Pat. No. 5,036,534 to Gural teaches a subscriber's interface enabling the connection of otherwise incompatible telephone device systems (hereinafter "(Z)") to a single telephone line, each telephone device system having devices such as: a computer modem (hereinafter "(F)"), an automatic answering machine (hereinafter "(A)"), and telephone sets (hereinafter "(T)"). When a ring signal is received from the central office, the interface allows a first device, such as (A) or (T) to answer the call, and monitors the communication between the calling party and the first device bearing in mind its various operating modes. Based on the monitored conversation, the interface determines if the call should be connected to a second device. If so, an actuating signal is sent to (F), whereupon when (F) becomes OFF HOOK, it is connected to the telephone line. If the first device is an automatic answering machine, its various operating modes include: outgoing message, incoming message, beeperless remote mode. If the first device is a remotely located telephone set, its various mode of operation include simple human voice signals and complex human voice signals.

A FIFTH EXAMPLE, U.S. Pat. No. 5,392,334 to O'Mahoney teaches a method for processing an incoming call on a telephone line in a computer system, wherein a telephony circuit detects a pick-up by a parallel device coupled to the telephone line while maintaining high voltage isolation. The telephony circuit performs hard line seizures to cause the parallel device to hang-up and soft line seizures to prevent a central office hang up after the parallel device hangs up.

A SIXTH EXAMPLE, U.S. Pat. No. 5,519,767 to O'Horo et al. teaches a call-waiting feature that is supported on voice-and-data modems by causing voice-and-data modems to go into voice-only mode upon receipt of the modem clear-down signal. A first voice-and-data modem engaged in an initial voice-and-data call with a second voice-and-data modem responds to receipt of a call-waiting signal by generating a replica of the call-waiting signal on the user's audio channel. The first modem responds to a user request to pick up the waiting call by sending the modem clear-down signal to the second voice-and-data modem, going into voice-only mode, and transmitting a waiting-call acceptance signal. The initial call that is placed on hold is thus a voice-only call. While in a voice-plus-data picked-up waiting call, the first modem responds to a user request to reinstate the initial call by again sending the modem cleardown signal, going into voice-only mode, and transmitting a call-resumption signal. The first modem is thus in voice-only-mode when it is reconnected to the initial, voice-only, call. The reconnected initial call may now be reconverted into a voice-plus-data call in the convention manner.

A SEVENTH EXAMPLE, U.S. Pat. No. 5,809,128 to McMullin teaches methods and apparatus for providing automatic redirection of an incoming voice telephone call from a caller to a subscriber proxy when an attempt by the caller to connect to a telephone link of a public switched telephone network (PSTN) is blocked due to the telephone link being occupied by a subscriber using the telephone link to establish communication between the subscriber's personal computer and a computer network. The subscriber proxy is connected to both the PSTN and the computer network, and produces audio interaction with the caller. The subscriber proxy also notifies the subscriber of the incoming call via the subscriber's computer. The subscriber's computer can optionally be used by the subscriber to control and interact with the incoming call by communicating with the computer proxy while the subscriber continues to occupy the telephone link.

AN EIGHTH EXAMPLE, U.S. Pat. No. 6,005,924 to Krexner et al. teaches a fax and phone combination device. The combination device is coupled to an external phone. From a phone line, the combination device receives a call signal, a fax signal, and an information signal. The call signal precedes the fax signal and the information signal. The combination device comprises a fax, an internal phone, and a call signal processor. The call processor processes the call signal received by the combination device and produces a first ringing signal from the call signal. The first ringing signal is intended for the internal phone. The combination device further comprises a ringing signal generator for generating a second ringing signal that is intended for the external phone, and a switch coupled to the fax, the internal phone, and the call processor. A call pulse in the call signal causes the switch to switch the combination device in a simulated receiving mode. In the simulated receiving mode, the fax signal detector detects whether the fax signal is present. If the fax signal is present, the fax signal is routed to the fax. If no fax signal is present, the second ringing signal is routed to the external phone.

A NINTH EXAMPLE, U.S. Pat. No. 6,067,353 to Szeliga teaches a method and related apparatus for detecting the presence of a call waiting signal on a telephone line, where the call waiting signal is embedded in various signals. The call waiting signal frequency is isolated from the various other frequencies. The isolated call waiting frequency is then biased so that only the positive voltage portions of the signal are allowed to pass. Each positive voltage pulse as well as the zero voltage pulses are then sampled to determine whether they are representative of a biased call waiting signal. Each time a determination is made, one is added to a count on an up-down counter. When the count reaches a predetermined number, a call waiting signal is detected on the telephone line. Preferably an alarm signals the presence of a detected call waiting signal to the user. A disconnect switch interrupts a modem so that a person using the modem on the same telephone line will have sufficient time to answer a detected incoming call.

A TENTH EXAMPLE, U.S. Pat. No. 6,259,353 to Berger et al. teaches a transponder communication device that interrogates an operational test transponder that is permanently within a receiving range of the transponder communication device. In response thereto, the operational test transponder sends operational test information to the transponder communication device. The transponder communication device checks whether received operational test information is valid, and generates an error signal if the received operational test information is invalid.

AN ELEVENTH EXAMPLE, U.S. Pat. No. 6,259,692 to Shtivelman et al. teaches a telephony call-waiting system for clients having a computer with a video display unit (PC/VDU) and a public-switched telephony network (PSTN) telephone connected to the PSTN by a single line, keeps a status indication of the client's Internet connection status and, during periods of time the PC/VDU is connected to the Internet, alerts the client by an alert signal over the Internet connection of any waiting PSTN calls. In a preferred embodiment the client's PC/VDU is adapted to provide an audio and/or visual alert event when an alert signal is received, and to provide for a user-initiated response to an alert, accepting or rejecting a call. In the event a call is accepted, provision is made for connecting the accepted call to the client's PC/VDU as an IP call. In some embodiments several calls may be dealt with at the PC/VDU, and features are provided such as caller-ID on the client's VDU. Several ways of accomplishing the call-waiting system are taught.

The distinctive ring feature is a service offered by telephone providers. In use, the switching system sends more than one type of ring signal to the telephone line of the user. The distinctive rings may advantageously be used to identify the intended recipient of the call, thus allowing users to decide whether or not to answer the call. As an example, a first distinctive ring may consist of one long ring, indicating a call to a number associated with one member of a house hold. A second distinctive ring consisting of a short ring may indicate a call to the number advertised as a business fax line, and a third distinctive ring consisting of two short rings may indicate a call to a second member of the house hold.

Systems offering the "distinctive ring" feature generally discuss one of two modes of use of that feature. The first mode is audio only use of the feature, in- which the audible ring signal of the telephone is the only cue to the user as to the identity of the intended recipient of the call. This teaches away from the use of a visual cue such as a flashing LED to convey the distinctive ring information. The second mode of use is use of the distinctive ring feature to do fax/phone switching.

These teach away from the use of a stand alone device to provide the distinctive ring feature along with the capabilities needed to allow a single telephone line to function in conjunction with Internet service. Crucially, they all fail to teach that a stand alone device may provide distinctive ring functionality to an on-line computer user, even though the telephone line may be in use by a modem.

Furthermore, even though previous innovations may be suitable for the specific individual purposes to which they are addressed they would not be suitable for the purposes of the present invention as hereinafter described.

SUMMARY OF THE INVENTION

General Summary

ACCORDINGLY, AN OBJECT of the present invention is to provide a self-contained distinctive ring detection and utilization device for using a single telephone line to receive telephone calls and facsimiles and recognition of distinctive rings while being simultaneously connectable to the Internet that avoids the disadvantages of the prior art.

ANOTHER OBJECT of the present invention is to provide a self-contained device for using a single telephone line to receive telephone calls and facsimiles while being simultaneously connectable to the Internet that is simple to use.

BRIEFLY STATED, STILL YET ANOTHER OBJECT of the present invention is to provide a self-contained device using a single telephone line to receive telephone calls and facsimiles, while using distinctive ring features, while being simultaneously connectable to the Internet. The device includes a single housing, a facsimile jack connected to a facsimile machine, a telephone/answering machine jack connected to a telephone/answering machine, a modem jack connected to a computer, a telephone line jack connected to a telephone outlet, a micro-processor and tone detectors communicating with the micro-processor, a filter capable of distinguishing distinctive rings, telephone line isolation and input amplification and filtration communicating with, and between, the tone detectors and the telephone line jack, a tone select communicating with the tone detectors, display and ring buzzer communicating with the micro-processor, a ring voltage generator communicating with, and between, the display ring buzzer and the facsimile jack, a status detect (on/off hook) communicating with the micro-processor, control relays communicating with the status detect (on/off hook), and output drivers communicating with the micro-processor.

The present invention is designed to provide a simple method of using the distinctive ring feature offered by telephone service carriers.

The present invention is designed to provide an all-in-one solution for multiple devices present and operating on a single standard telephone line. The benefits include the ability to receive calls and faxes, whether online or not online and to remain online if already on line. Additionally, the present invention switches between voice and fax calls, automatically and without any intervention from the user. In addition the present invention also permits the user to receive both call an faxes while not on line.

To achieve the combined functions, the present invention integrates a micro-processor which coordinates general functionality. Tone detection circuitry, which provides extremely narrow and selective detection range and detects the appropriate tones. Care is taken to assure a narrow enough detector design which will not false alarm or detect such sound as modem noise which is far stronger, louder, and full spectrum than the intended detection range, which includes a fax tone and a call waiting tone.

Additionally, other detection tones for call waiting are selectively made available for other countries. Such tones are selected by the user or manufacturer.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

SUMMARY IN REFERENCE TO CLAIMS

It is therefore one aspect, advantage, embodiment and feature of the invention to teach a self-contained device for using a single telephone line to receive telephone calls and facsimile messages for transmission respectively to a telephone/answering machine and a facsimile machine while being simultaneously connectable to the Internet by a computer having a modem, said device comprising: a single housing having a wall and a microprocessor; a facsimile jack located on the wall of the single housing; a telephone/answering machine jack located on the wall of the single housing; a modem jack located on the wall of the single housing; a telephone line jack located on the wall of the single housing; a distinctive ring filter able to identify the recipient of a distinctive ring signal; a display located on the single housing; the display being operatively connected to and controlled by the filter.

It is therefore one aspect, advantage, embodiment and feature of the invention to teach a device wherein the filter uses digital signal processing to analyze the distinctive rings.

It is therefore one aspect, advantage, embodiment and feature of the invention to teach a device wherein the filter uses fuzzy logic to analyze the distinctive rings.

It is therefore one aspect, advantage, embodiment and feature of the invention to teach a device wherein the filter uses look up tables to analyze the distinctive rings.

It is therefore one aspect, advantage, embodiment and feature of the invention to teach a device wherein the display is operatively connected to and controlled by the filter.

It is therefore another aspect, advantage, embodiment and feature of the invention to teach a device, wherein the display is operatively connected to the micro-processor, and wherein the distinctive ring filter conveys distinctive ring information to the micro-processor, and wherein the filter is operatively connected to and controlled by the micro-processor.

It is therefore another aspect, advantage, embodiment and feature of the invention to teach a device further comprising: a power supply having an input, a cable and an AC transformer adapted to connect to an AC power source.

It is therefore another aspect, advantage, embodiment and feature of the invention to teach a device, wherein said power supply further has a 5 volt voltage regulator.

It is therefore another aspect, advantage, embodiment and feature of the invention to teach a device, further comprising one member selected from the group consisting of:
   1) at least one tone detector in communication with the micro-processor and having a fax tone detector;
   2) at least one tone detector having selectable frequency capability for receiving tones of different frequencies;
   3) at least one telephone line isolation, amplification and filtration device located within the single housing; and
   4) combinations thereof.

It is therefore another aspect, advantage, embodiment and feature of the invention to teach a device, wherein the display comprises at least one member selected from the group consisting of:
   1) a buzzer;
   2) a light;
   3) an LED; and
   4) combinations thereof.

It is therefore another aspect, advantage, embodiment and feature of the invention to teach a device, wherein the micro-processor responds to receipt of distinctive rings by automatically handling an incoming call.

It is therefore another aspect, advantage, embodiment and feature of the invention to teach a device, wherein the automatic handling of the incoming call comprises one member selected from the group consisting of:
   1) suspending Internet access;
   2) routing the call to a facsimile machine;
   3) routing the call to a telephone/answering machine;
   4) sending to the user the distinctive ring information in order to allow the user to manually determine handling of the call;

5) ignoring the call;

6) routing the call to a modem; and 7) combinations thereof.

It is therefore yet another aspect, advantage, embodiment and feature of the invention to teach a method of receiving a distinctive ring comprising the steps of:

1) accessing a service provider by means of a telephone line having the distinctive ring feature;

2) monitoring the telephone line using a stand alone device;

3) upon receipt of a distinctive call waiting tone, carrying out the following steps 4 through 7 inclusive:

4) identifying the distinctive call waiting tone;

5) determining and sounding/displaying the distinctive ring pattern;

6) determining if a call is to be answered;

7) if the call is to be answered, carrying out the following steps 8 through 10 inclusive:

8) flashing the telephone line, thereby automatically placing the service provider on hold and connecting to the caller;

9) monitoring the telephone line using the stand alone device until the telephone is hung up; and 10) flashing the telephone line, thereby automatically connecting to the service provider.

It is therefore yet another aspect, advantage, embodiment and feature of the invention to teach a method further comprising the steps of:

11) determining if the service provider has logged off of the computer; and 12) reconnecting to the service provider.

It is therefore yet another aspect, advantage, embodiment and feature of the invention to teach a method wherein the step of determining and sounding/displaying the distinctive ring signal further comprises use of digital signal processing.

It is therefore yet another aspect, advantage, embodiment and feature of the invention to teach a method wherein the step of determining and sounding/displaying the distinctive ring signal further comprises use of a look up table.

It is therefore yet another aspect, advantage, embodiment and feature of the invention to teach a method wherein the step of determining and sounding/displaying the distinctive ring signal further comprises use of fuzzy logic.

It is therefore yet another aspect, advantage, embodiment and feature of the invention to teach a method wherein the step of determining if a call is to be answered further comprises one member selected from the group consisting of: manually determining if the call is to be answered by awaiting user input, automatically determining if the call is to be answered by consulting information provided during the set-up of the device

INDEX OF REFERENCE NUMERALS

Figure 1:
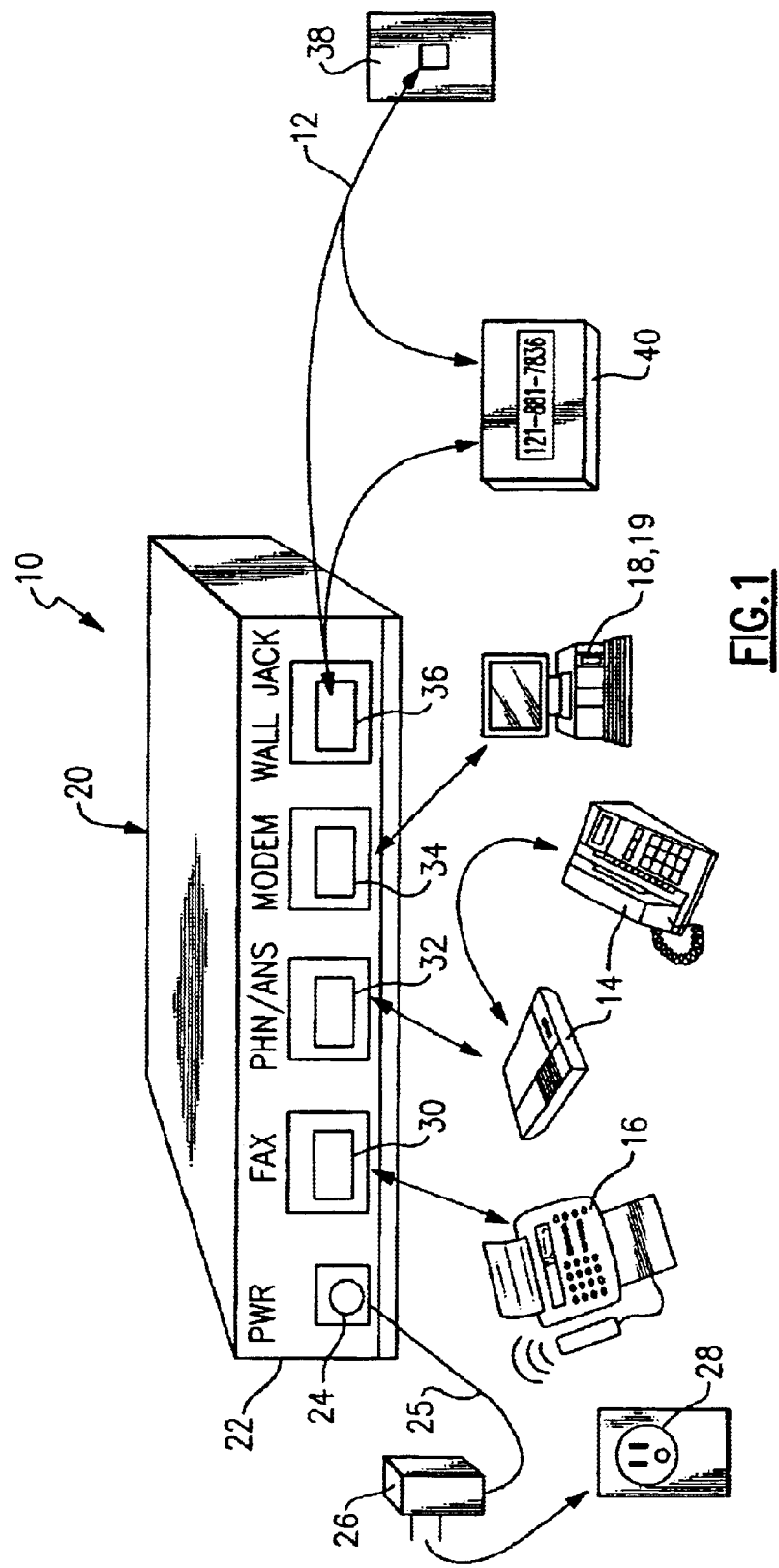
FIG. 1 is a diagrammatic perspective view of the present invention interfacing with associated inputs.

| | |
|---|---|
| 10 | self-contained device of present invention for using single telephone line 12 to receive telephone calls and facsimiles for transmission respectively to a telephone/answering machine 14 and facsimile machine 16 while being simultaneously connectable to the Internet by computer 18 |
| 12 | single telephone line |
| 14 | telephone/answering machine |
| 16 | facsimile machine |
| 18 | computer |
| 20 | single housing |
| 22 | back wall of single housing 20 |
| 24 | power supply input |
| 25 | cable |
| 26 | AC transformer for connecting to AC power source 28 |
| 28 | AC power source |
| 30 | facsimile jack for connecting to facsimile machine 16 |
| 32 | telephone/answering machine jack for connecting to telephone/answering machine 14 |
| 34 | modem jack for connecting to computer 18 |
| 36 | telephone line jack for connecting to telephone outlet 38 |
| 38 | telephone outlet |
| 40 | caller ID device |
| 41 | power supply |
| 42 | micro-processor |
| 43 | 5 volt voltage regulator of power supply 41 |
| 44 | tone detectors |
| 44a | fax tone detector of tone detectors 44 |
| 44b | call waiting tone detector of tone detectors 44 |
| 44c | distinctive ring filter of tone detector 44 |
| 45 | telephone line isolation and input amplification and filtration |
| 46 | tone select |
| 48 | display and ring buzzer |
| 50 | ring voltage generator |

DETAILED DESCRIPTION

The present invention makes use of the distinctive ring signal and/or distinctive ring call waiting signal offered as a feature by many telephone service providers, to allow simultaneous use of the Internet and the call waiting features. For purposes of this patent application, it will be understood that the terms "distinctive ring signal", "distinctive call waiting tone", and the like are used interchangeably herein. In addition, "Internet Service Provider", "ISP", or just "service provider" and the like are used interchangeably herein.

In general, when a user is on-line, they will be enabled by the device of the invention to receive distinctive rings/call waiting signals and then decide, either manually or automatically, whether they wish to break off their Internet session or ignore the telephone call.

Figure 2:
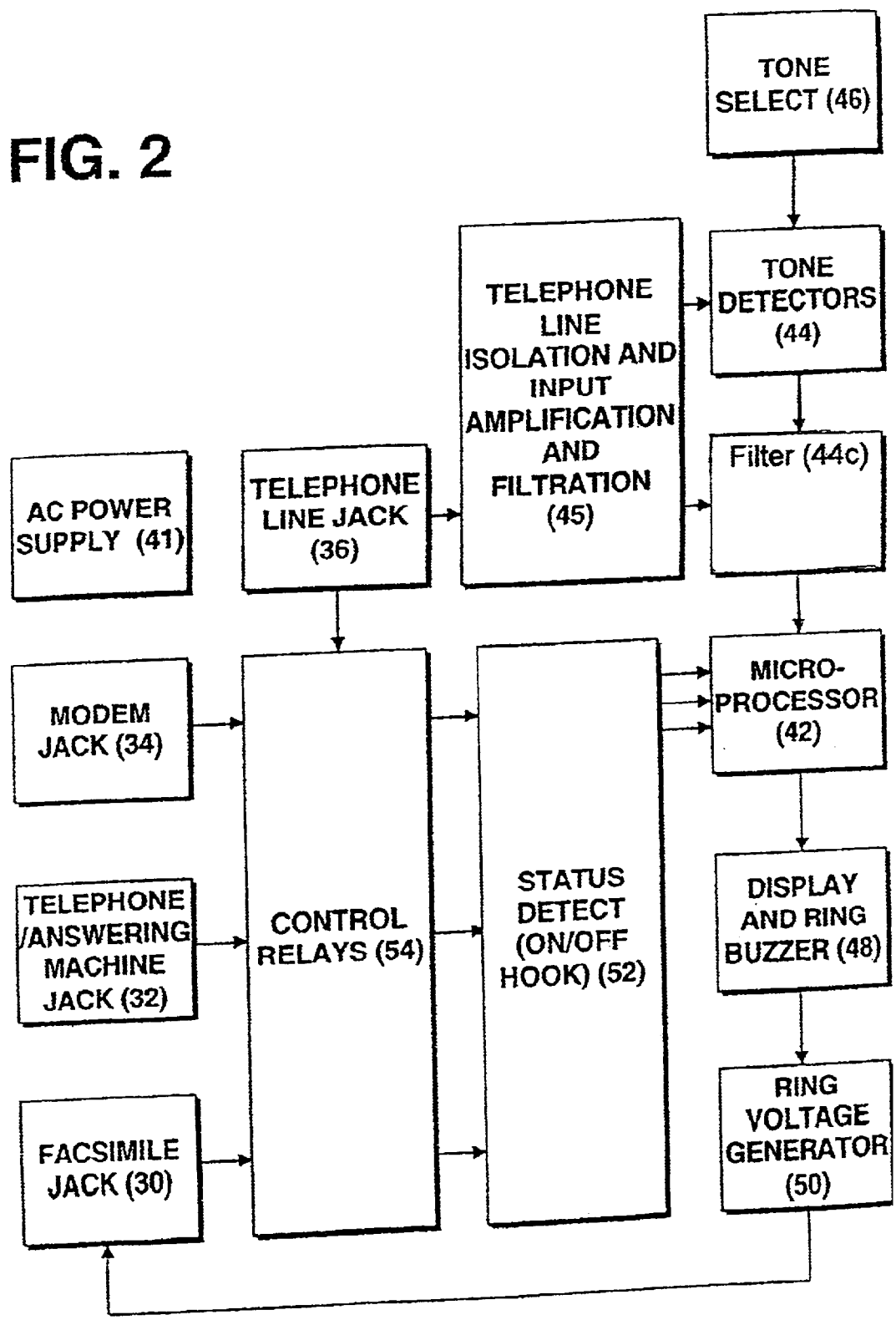
FIG. 2 is a block diagram of the present invention.

Referring now to the Figures, in which like numerals indicate like parts, and particularly to FIGS. 1 and 2, the self-contained device of the present invention is shown generally at 10 for using a single telephone line 12 to receive telephone calls and facsimiles for transmission respectively to a telephone/answering machine 14 and a facsimile machine 16 while being simultaneously connectable to the Internet by a computer 18 that has a modem 19.

The self-contained device 10 comprises a single housing 20 that has a back wall 22.

The self-contained device 10 further comprises a power supply input 24. The power supply input 24 is on the back wall 22 of the single housing 20 and is connected by a cable 25 to an AC transformer 26 for connecting to an AC power source 28.

The self-contained device 10 further comprises a facsimile jack 30. The facsimile jack 30 is on the back wall 22 of the single housing 20 and is for connecting to the facsimile machine 16.

The self-contained device 10 further comprises a telephone/answering machine jack 32. The telephone/answering machine jack 32 is on the back wall 22 of the single housing 20 and is for connecting to the telephone/answering machine 14.

The self-contained device 10 further comprises a modem jack 34. The modem jack 34 is on the back wall 22 of the single housing 20 and is for connecting to the computer 18.

The self-contained device 10 further comprises a telephone line jack 36. The telephone line jack 36 is on the back wall 22 of the single housing 20 and is for connecting to a telephone outlet 38. If a caller ID device 40 is used, the caller ID device 40 is connected between the telephone line jack 36 and the telephone outlet 38.

The self-contained device 10 further comprises a power supply 41. The power supply 41 is contained in the single housing 20 and communicates with the power supply input 24. The power supply 41 includes a 5 volt voltage regulator 43.

The self-contained device 10 further comprises a micro-processor 42. The micro-processor 42 is contained in the single housing 20 and makes most of the functional decisions. A typical example of the micro-processor 42 is Microchip PIC 16C54.

The self-contained device 10 further comprises tone detectors 44. The tone detectors 44 are contained in the single housing 20, communicate with the micro-processor 42, and include a fax tone detector 44a and a call waiting tone detector 44b.

The self-contained device 10 further comprises distinctive ring filter 44c. Distinctive ring filter 44c is contained within the single housing 20 of self-contained device 10, and may be an independent device, a part of micro-processor 42 or a part of tone detectors 20. Filter 44c may also be a software implementation running on micro-processor 42 within self-contained device 10. Such a software implementation may be modified and programmed via download from either a telephone line or from an attached computer, or may be modified and programmed by means of hardware on single housing 20: mode/function buttons, etc. Filter 44c recognizes distinctive ring signals received by tone detector 44.

Filter 44c may utilize DSP, digital signal processing, in the preferred embodiment of the invention. One advantage of DSP is that it in turn facilitates the use of pattern recognition algorithms to compensate for dropped out signal. Such pattern recognition may in turn utilize look up tables and/or fuzzy logic. An example of the functionality of fuzzy logic and look up tables, may be a case in which a user has two distinctive rings programmed, the first distinctive ring being a single short ring signal and the second distinctive ring being a long signal followed by a short signal. Should a ring signal be corrupted by the dropping of a portion of the long ring, it will be received as two short signals. Ordinarily, this would be unrecognizable. However, by the use of fuzzy logic, the two entries on the look up table can be compared and the stand alone device may correctly deduce that the two short signals are more likely to be the second distinctive ring and less likely to be the first distinctive ring.

The fax tone detector 44a detects a fax tone when the self-contained device 10 is in a mode to detect the fax tone. A typical example of the fax tone detector 44a is LM567 (National Semiconductor) or NJM567 (New Japan Radio).

The call waiting tone detector 44b is a tone detector with switched capacitor or digital signal processing (DSP) detection that detects a call-waiting tone and also discriminates between the call-waiting tone and modem noise present at that time. The call waiting tone detector 44b has selectable frequencies for different tones in other countries. A typical example of the call waiting tone detector 44b is Teltone M982-02.

The self-contained device 10 further comprises telephone line isolation and input amplification and filtration 45. The telephone line isolation and input amplification and filtration 45 are contained in the single housing 20 and communicate with, and between, the tone detectors 44 and the telephone line jack 36.

The self-contained device 10 further comprises a tone select 46. The tone select 46 is contained in the single housing 20 and communicates with the tone detectors 44.

The self-contained device 10 further comprises a display and ring buzzer 48. The display and ring buzzer 48 are contained in the single housing 20 and communicate with the micro-processor 42. The micro-processor 42 generates tone for the display and ring buzzer 48.

The self-contained device 10 further comprises a ring voltage generator 50. The ring voltage generator 50 is contained in the single housing 20 and communicates with, and between, the display ring buzzer 48 and the facsimile jack 30.

The jacks 30, 32, 34, and 36 are operatively connected so as to allow transmission of analog or digital information therebetween, thus allowing transmission of such information/data between the telephone line 12 and the various devices attached to the self-contained device 10. Micro-processor 42 is further able to direct incoming calls by means of the jacks 30, 32, 34, and 36 to such attached devices. Finally, micro-processor 42 and/or filter 44c is/are able to control the operation of display/buzzer 48.

Figure 3:
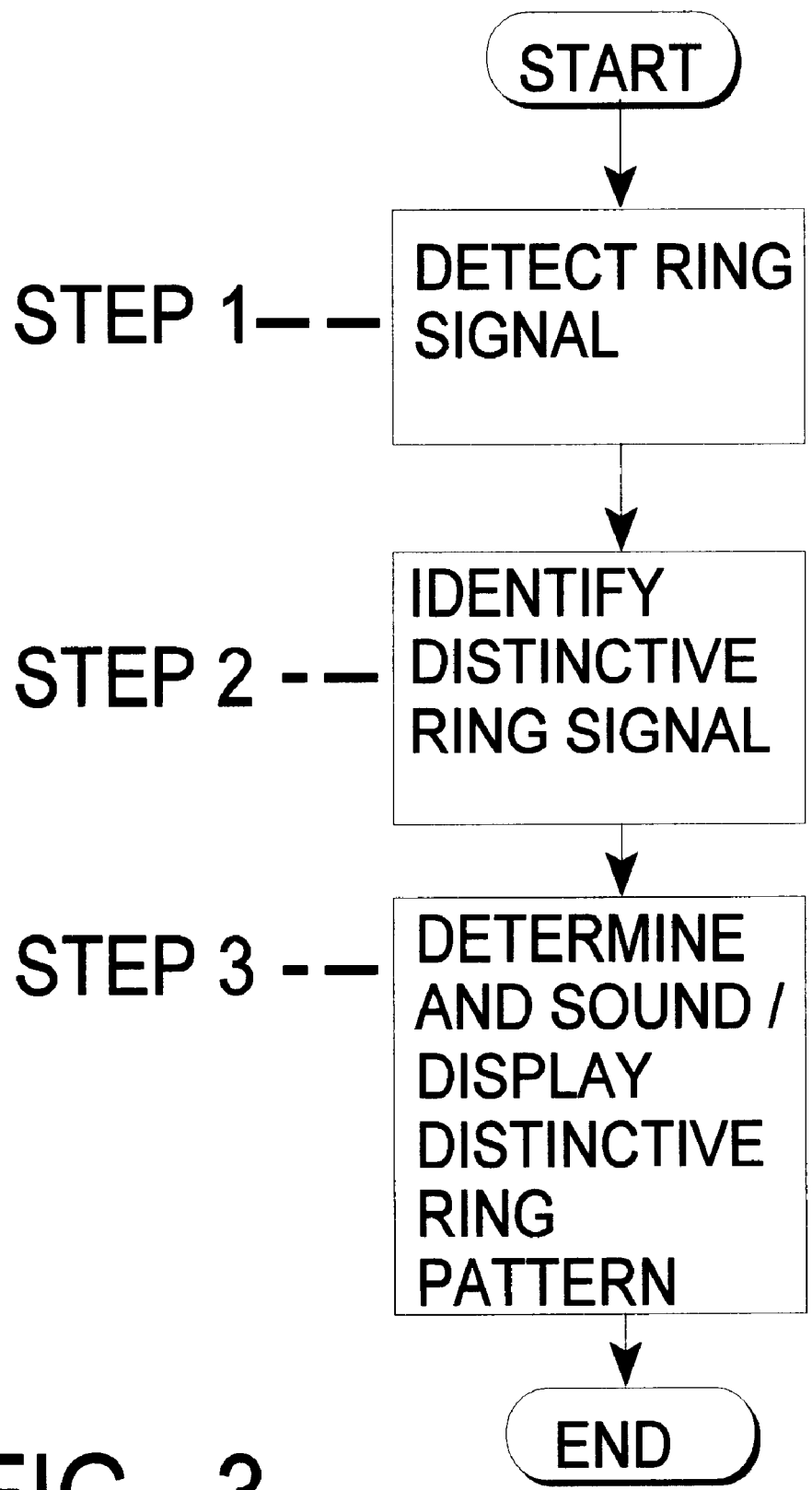
FIG. 3 is a flow chart of the method of identifying distinctive ring signals during operation of the present invention.
Figure 4A:
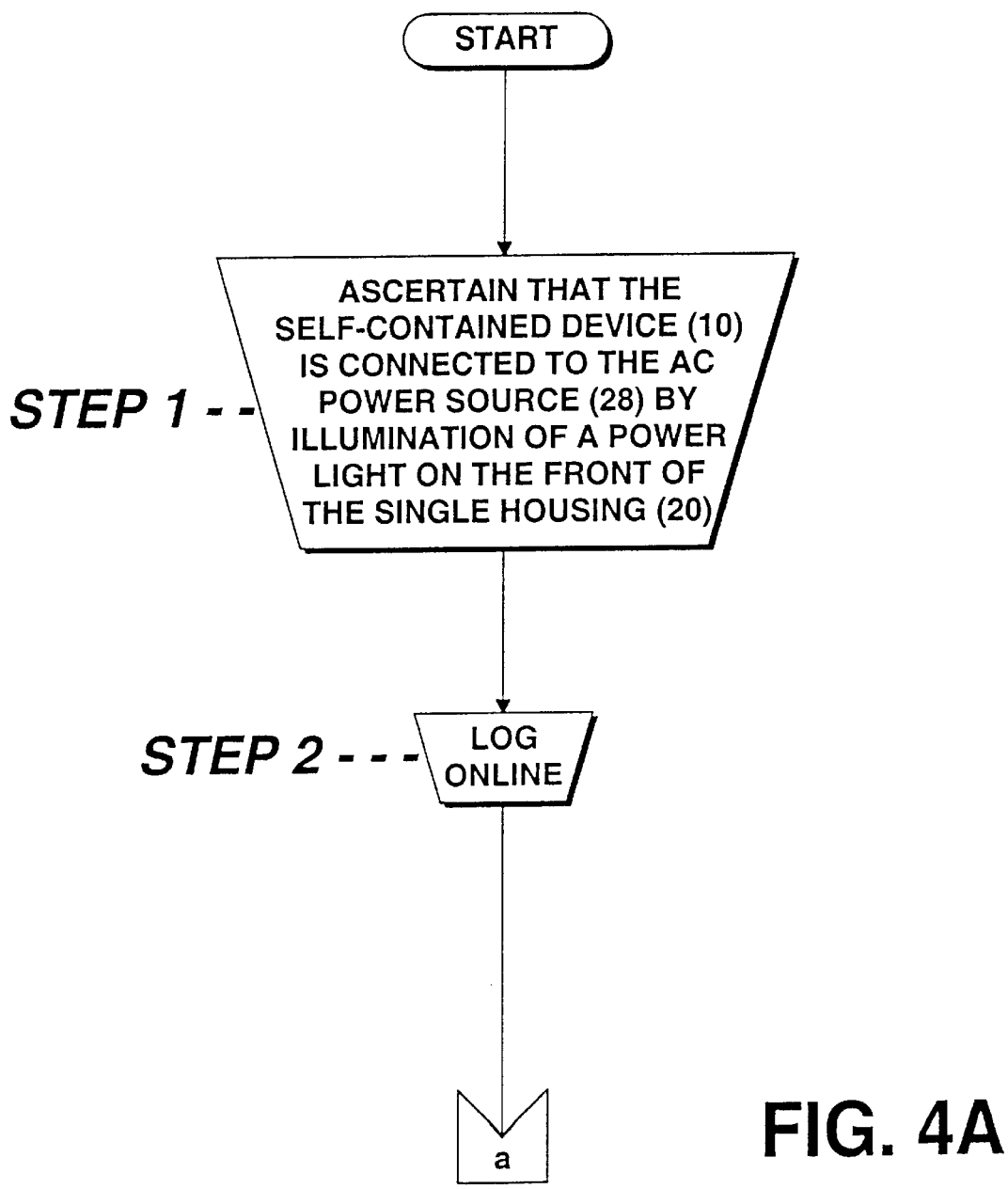
FIGS. 4A-4D are a flow chart of the overall method of operation of the present invention, during which identification of distinctive rings according to FIG. 3 occurs.
Figure 4B:
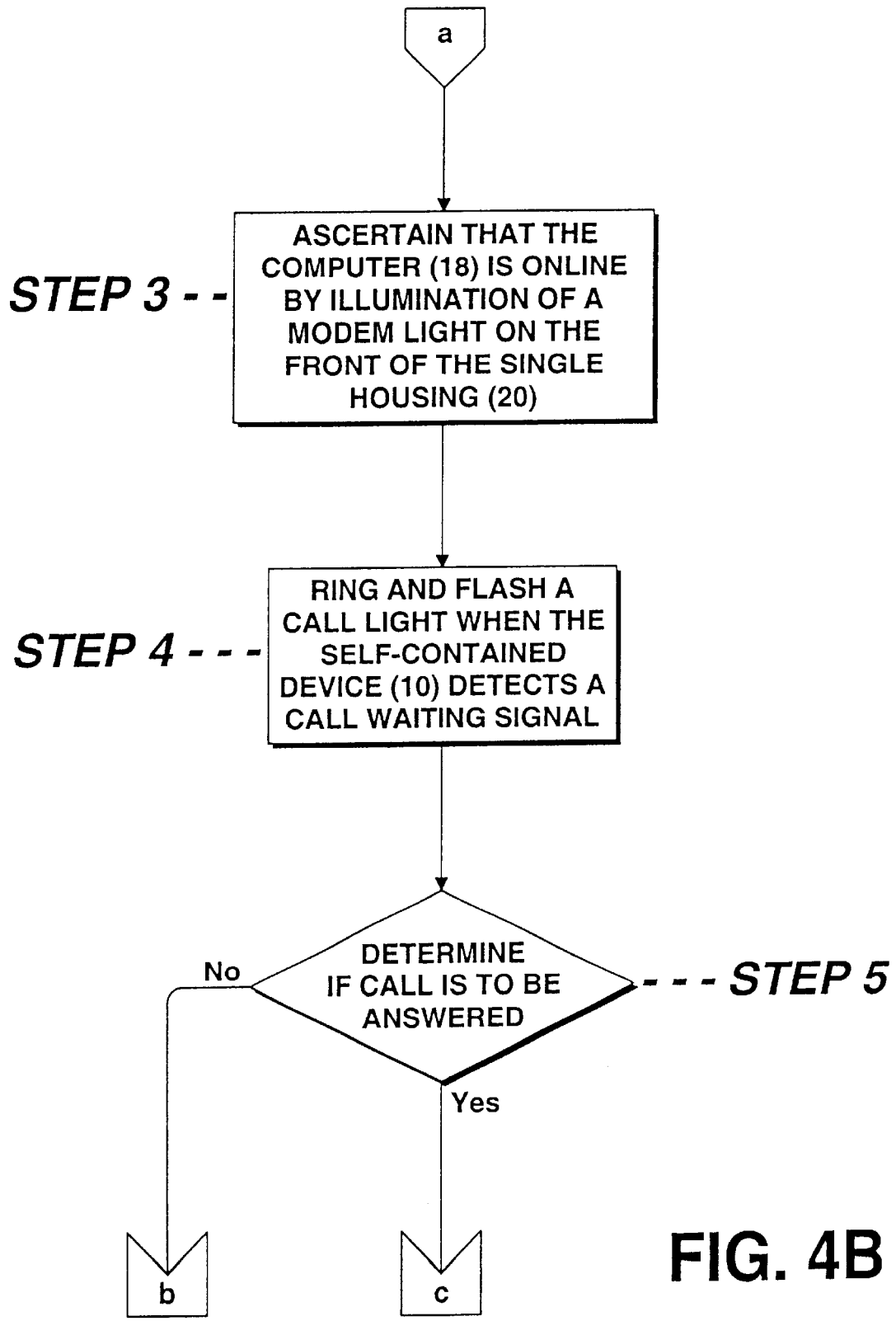
Figure 4C:
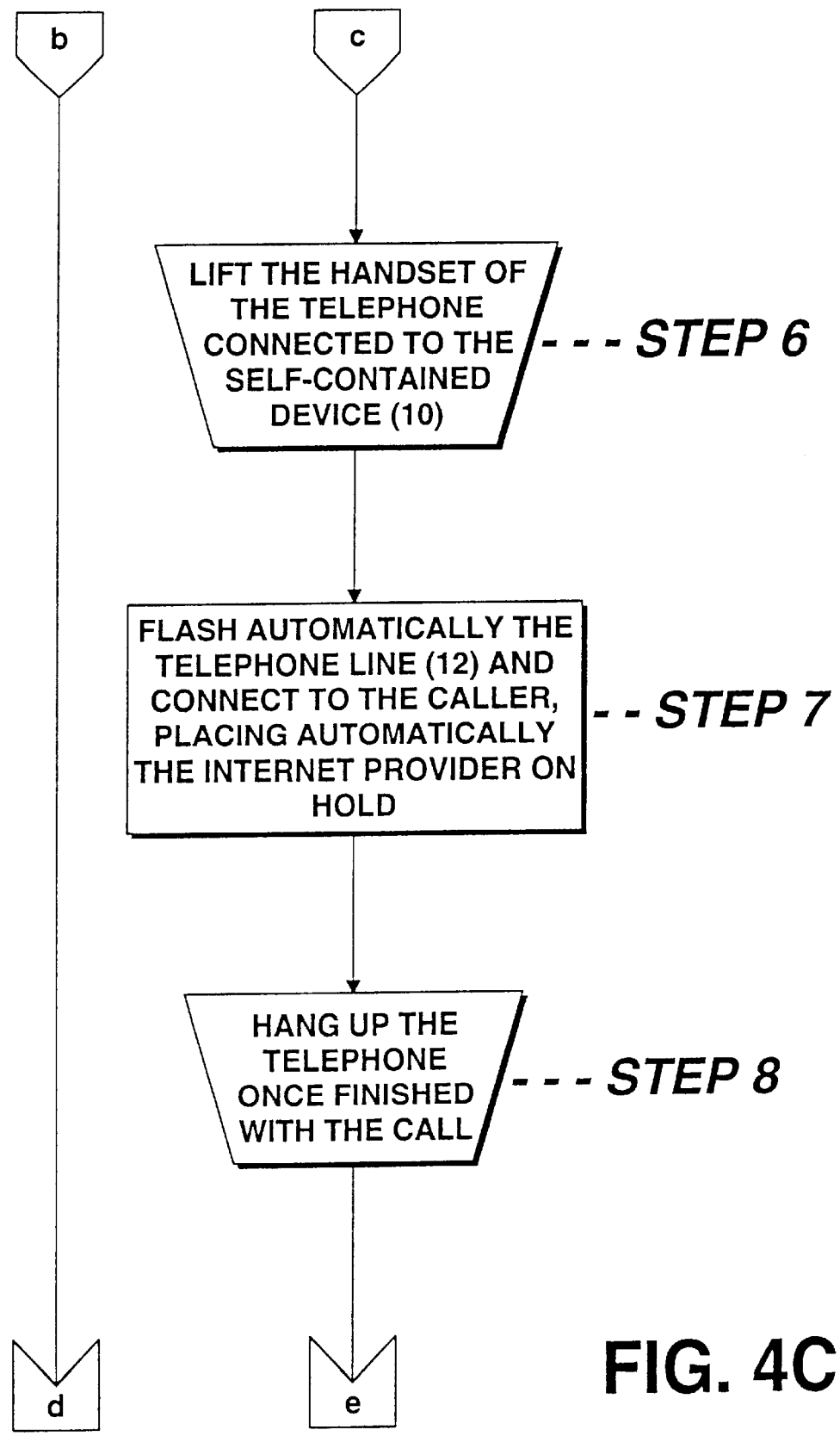
Figure 4D:
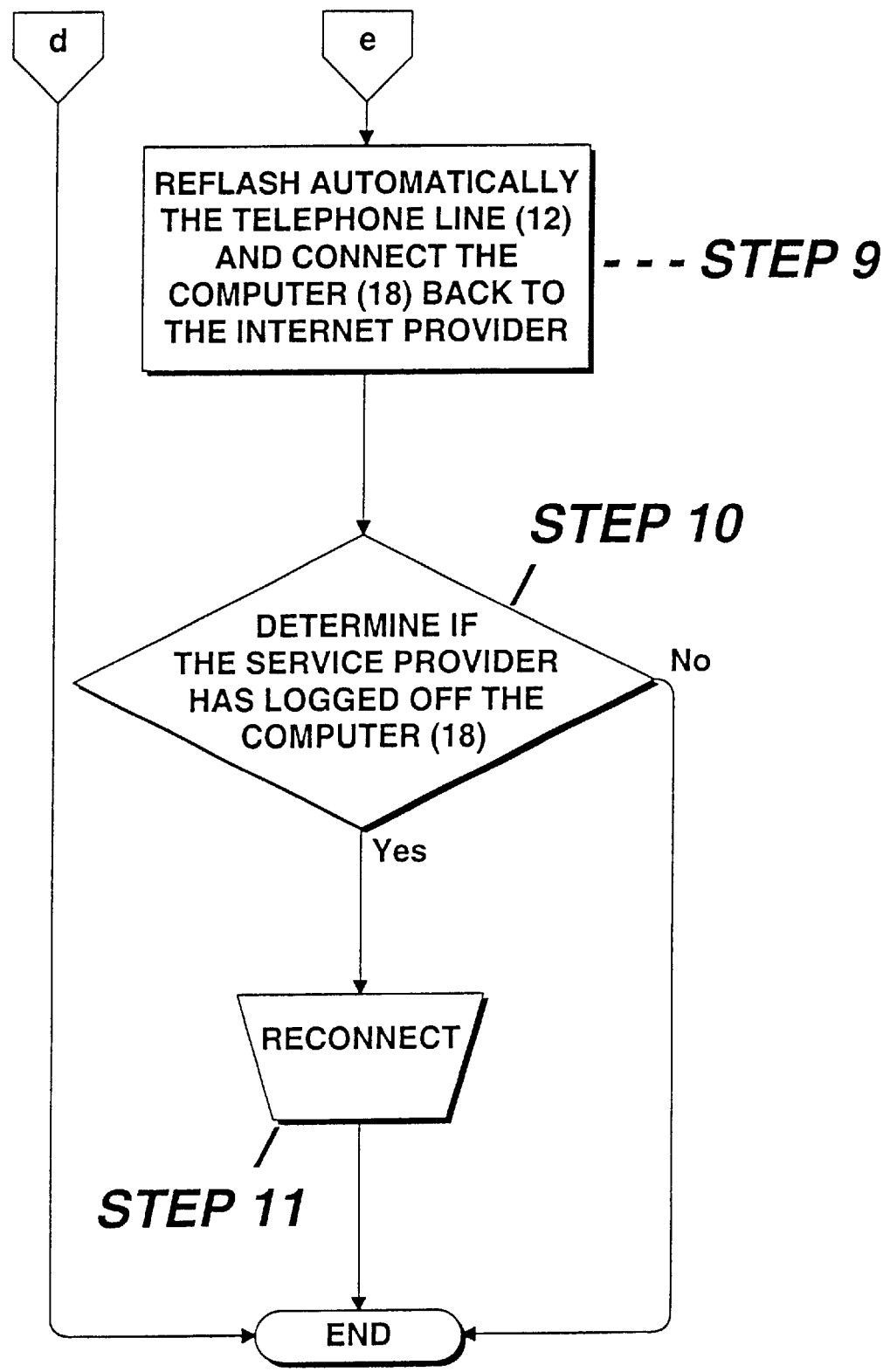
Figure 5A:
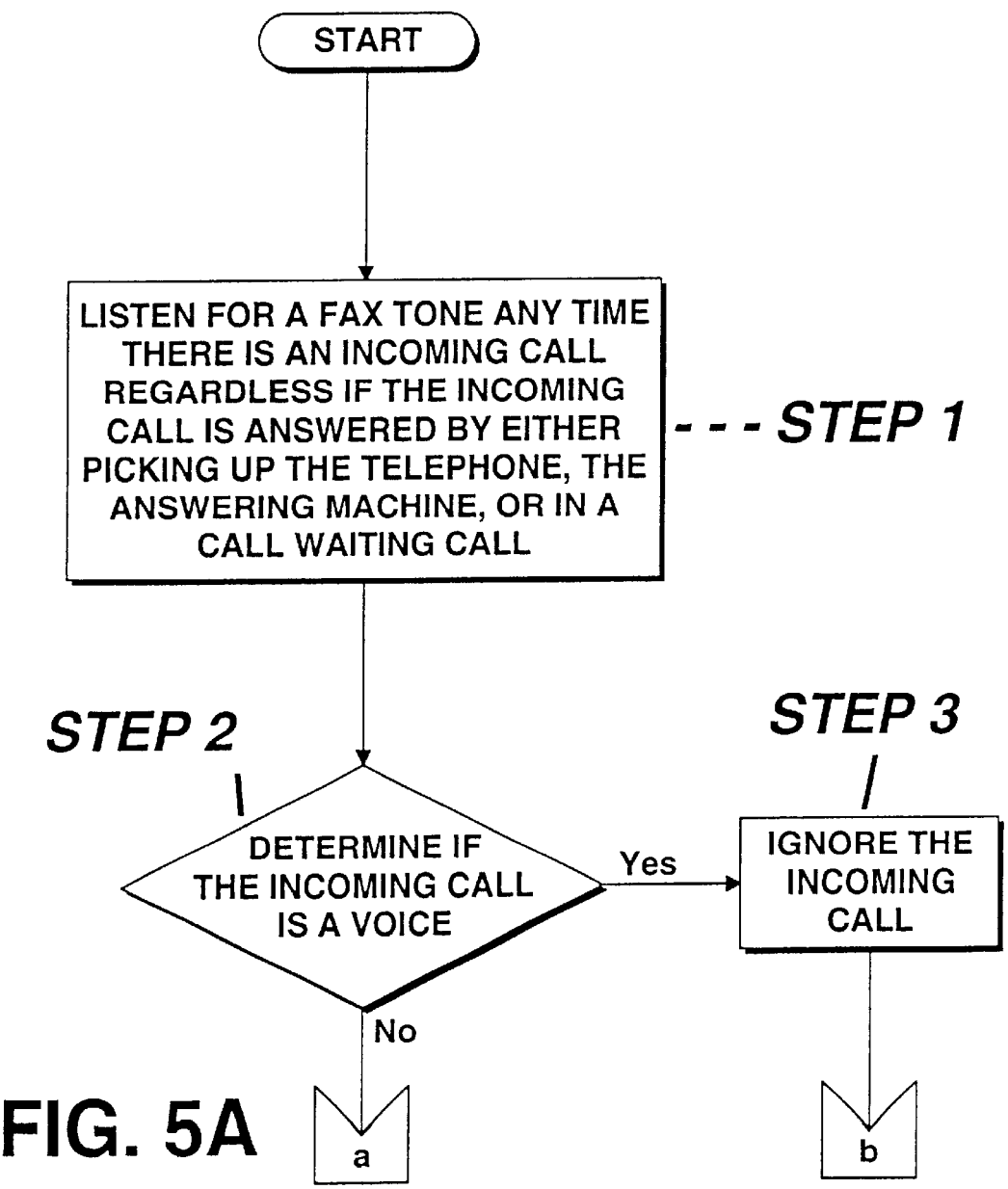
FIGS. 5A-5B and 6A-6G are flow charts of the method of operation of the present invention when used with a facsimile machine, during which identification of distinctive rings according to FIG. 3 occurs.
Figure 5B:
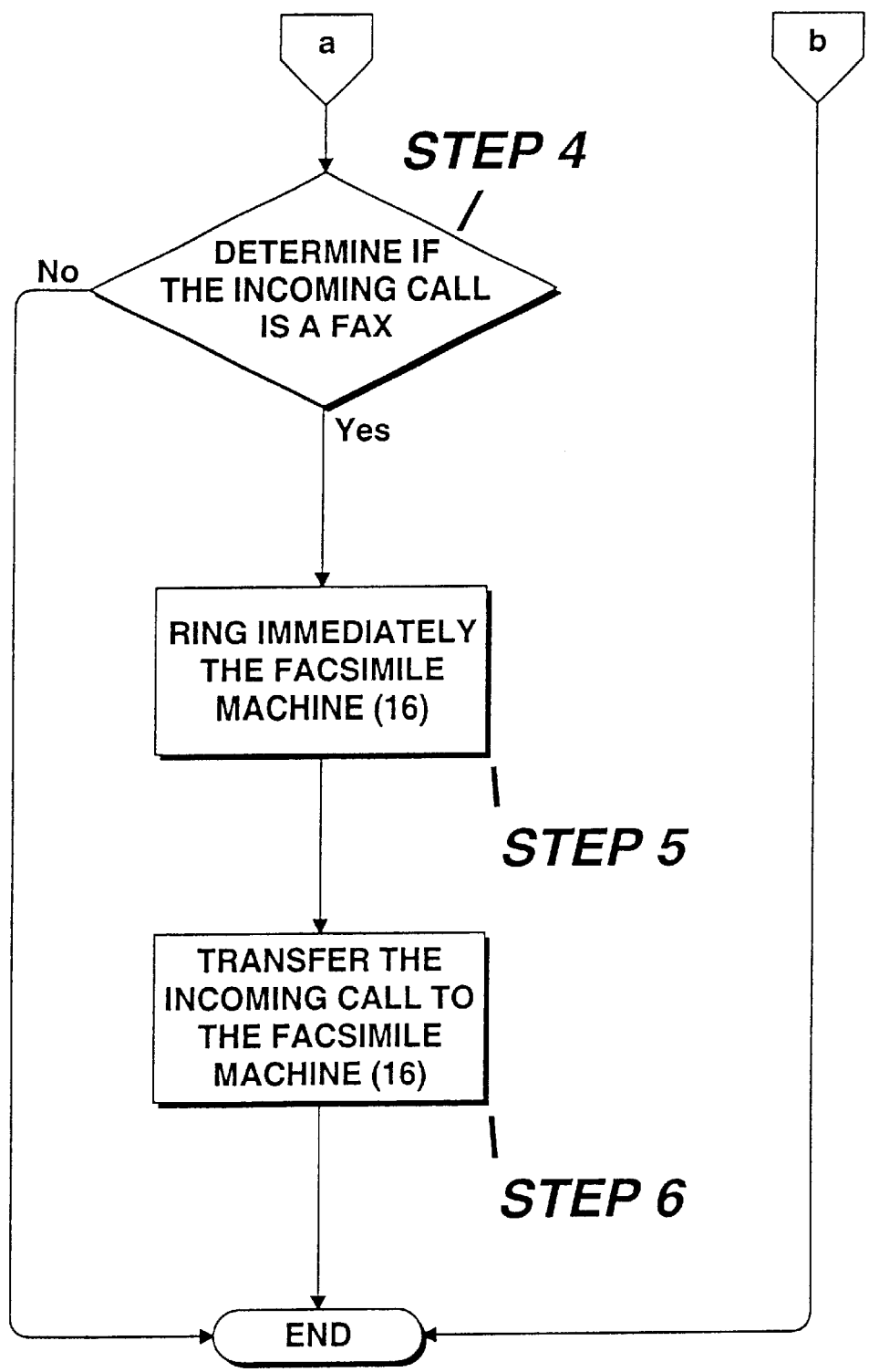
Figure 6A:
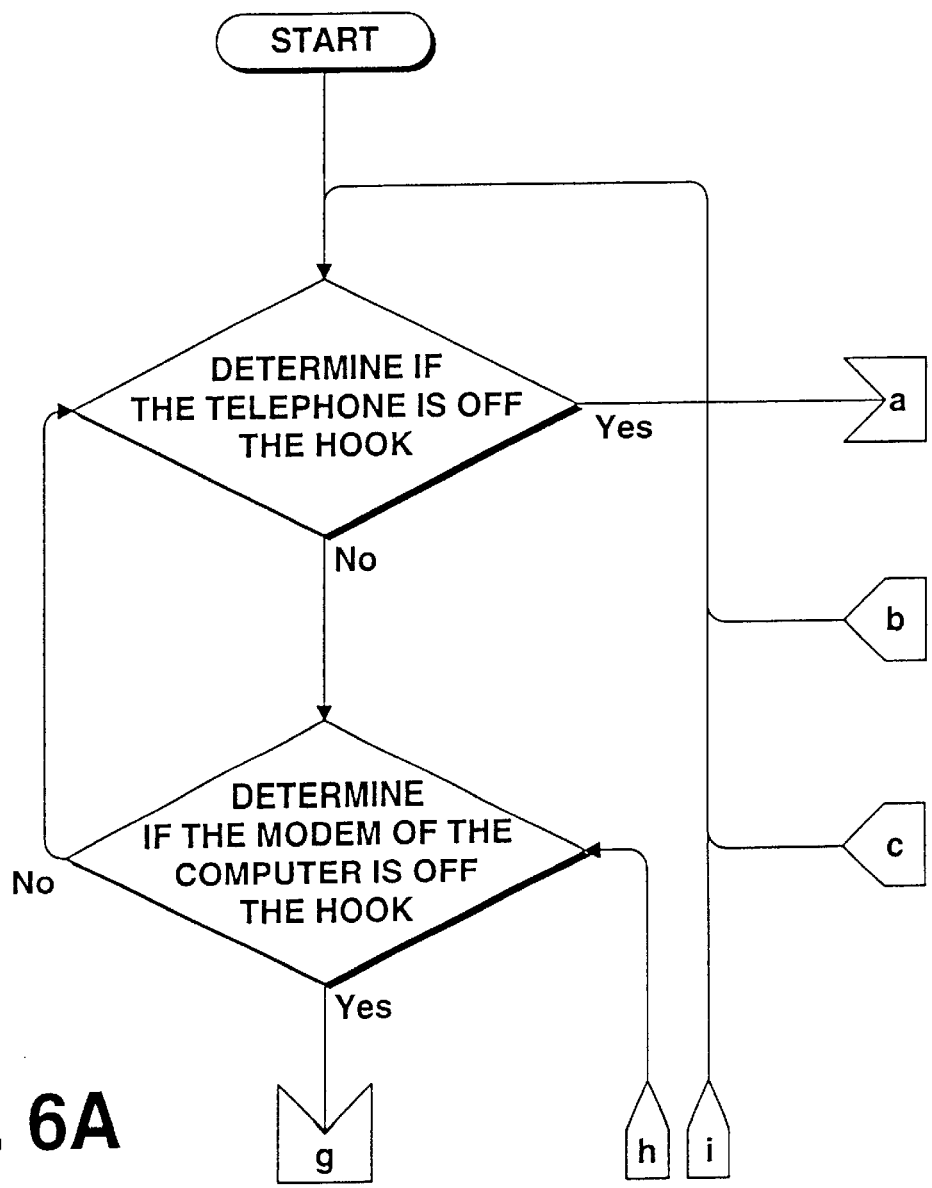
Figure 6B:
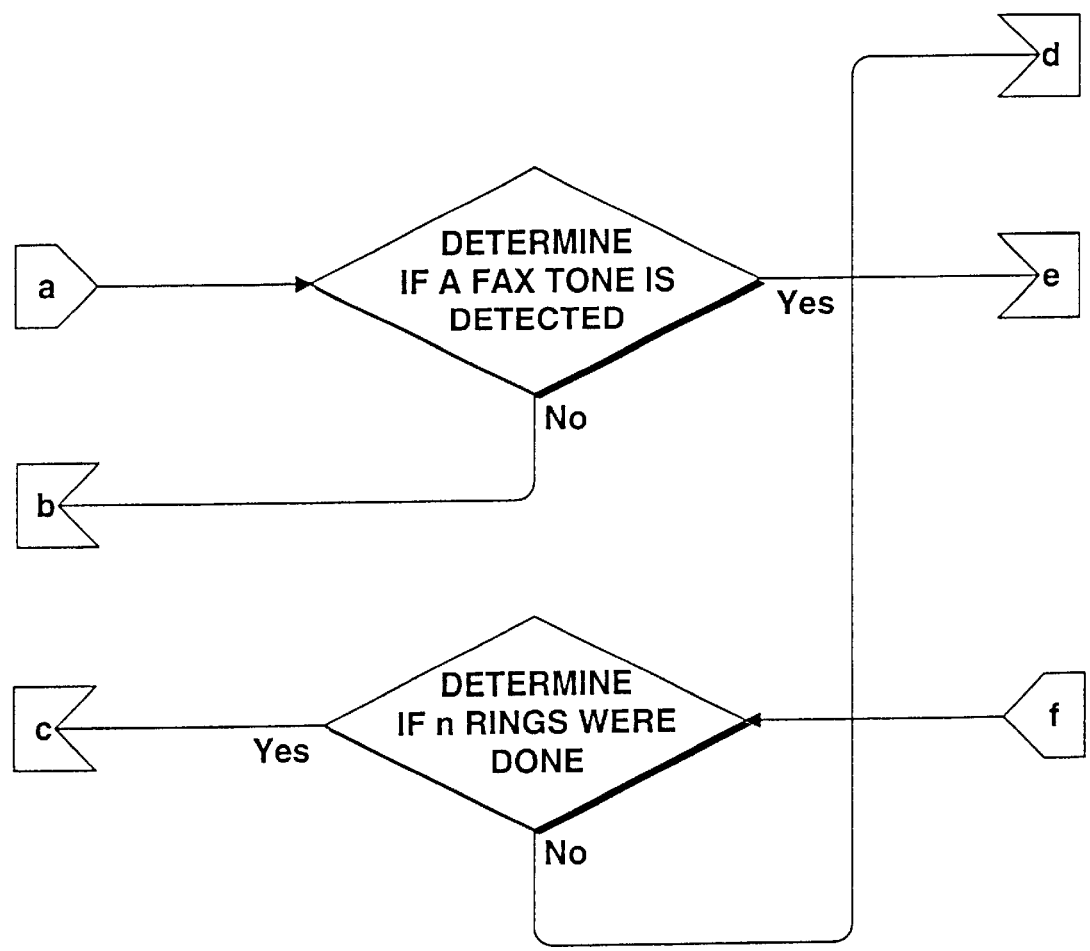
Figure 6C:
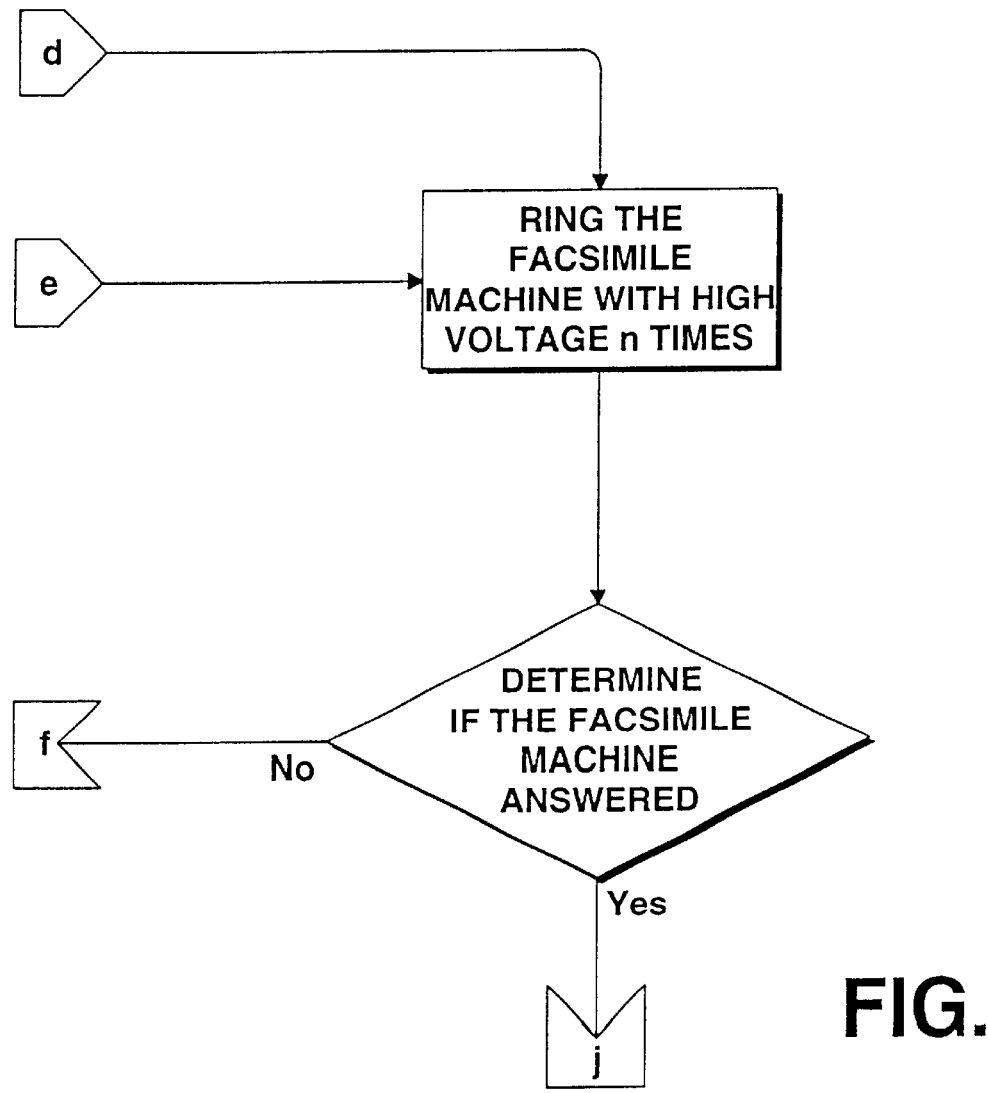
Figure 6D:
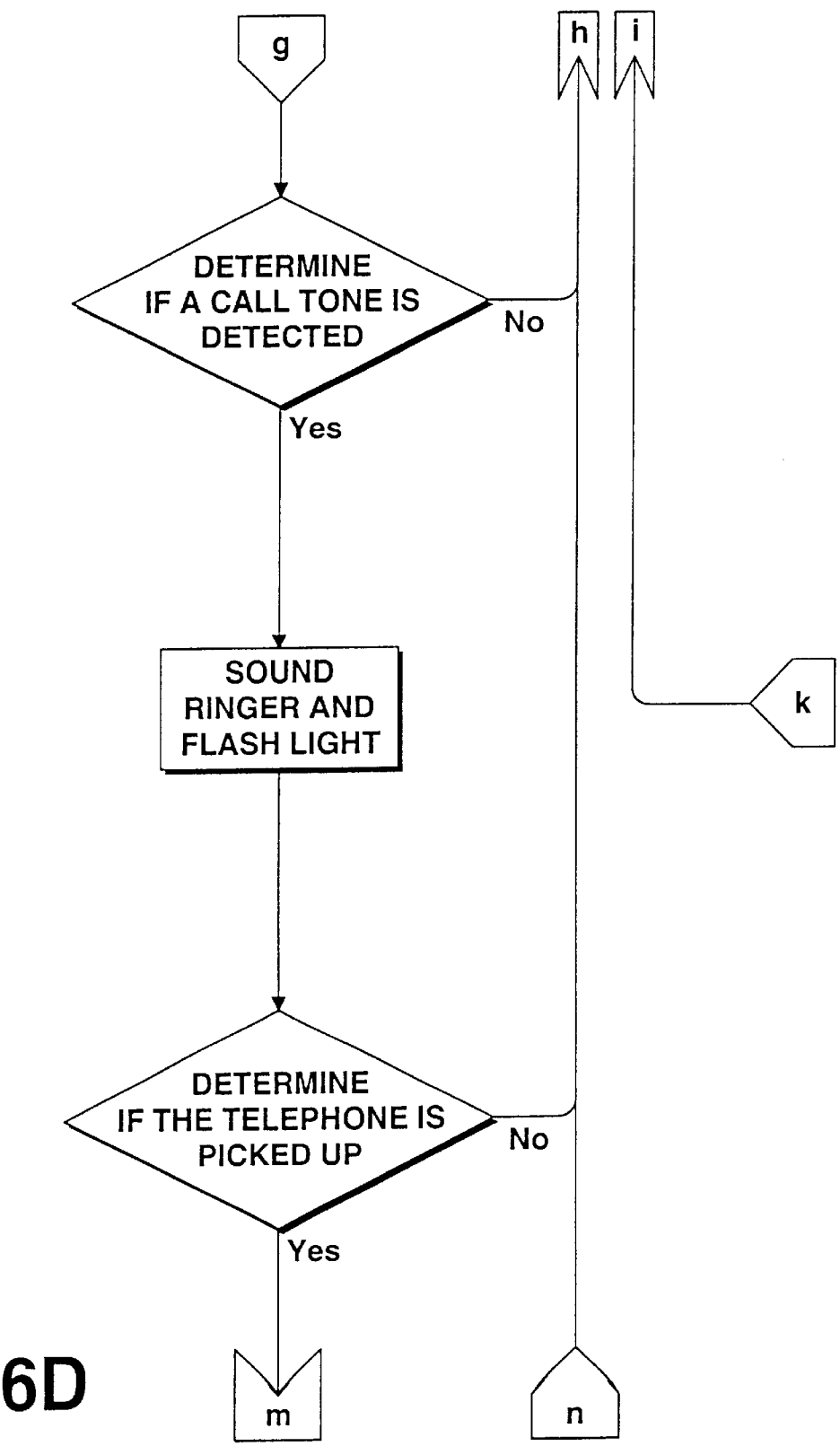
Figure 6E:
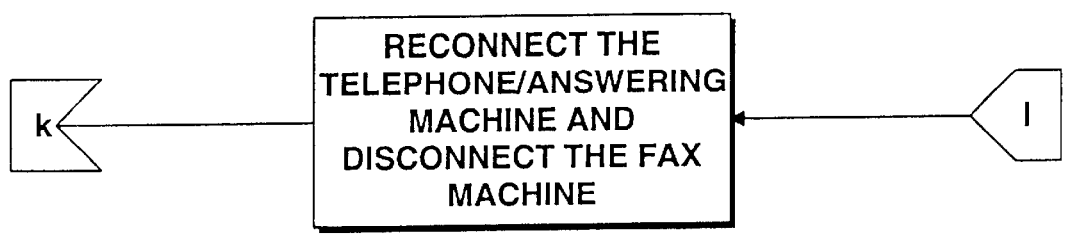
Figure 6F:
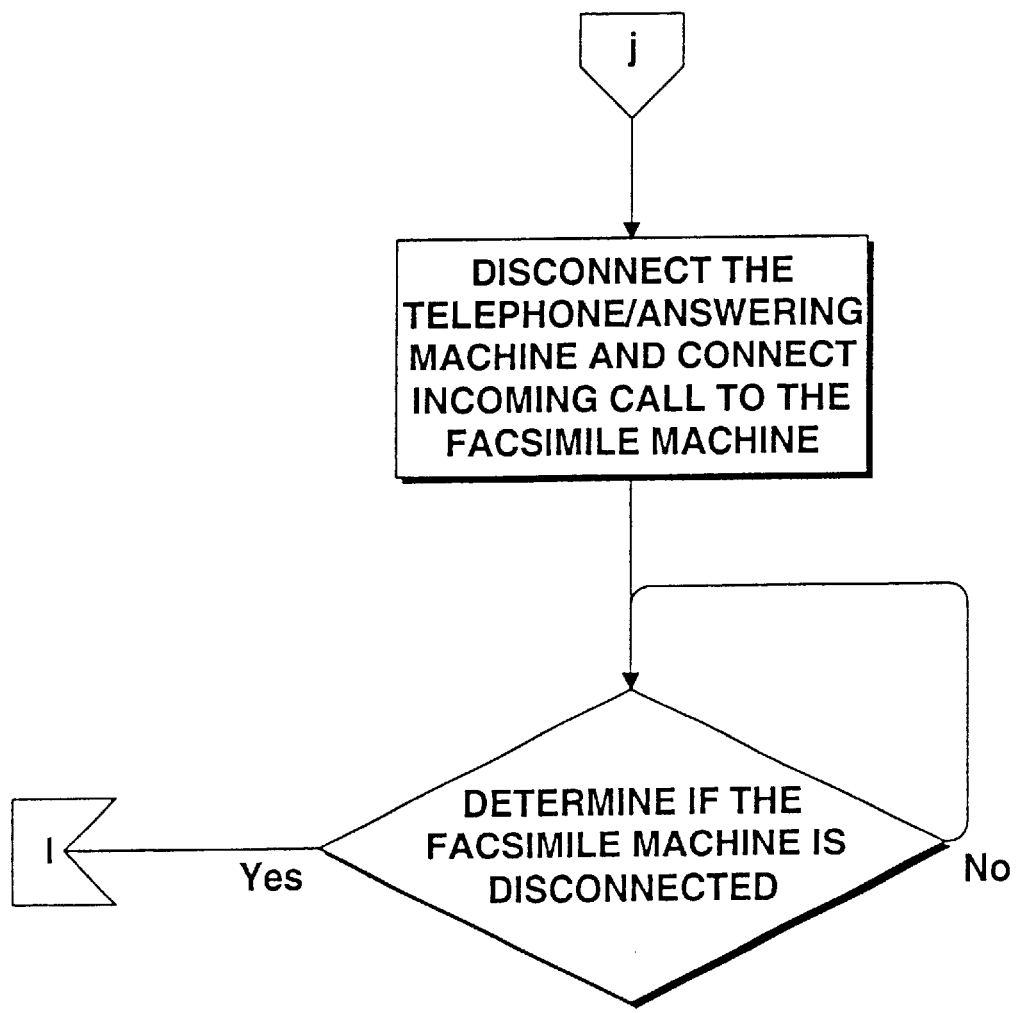
Figure 6G:
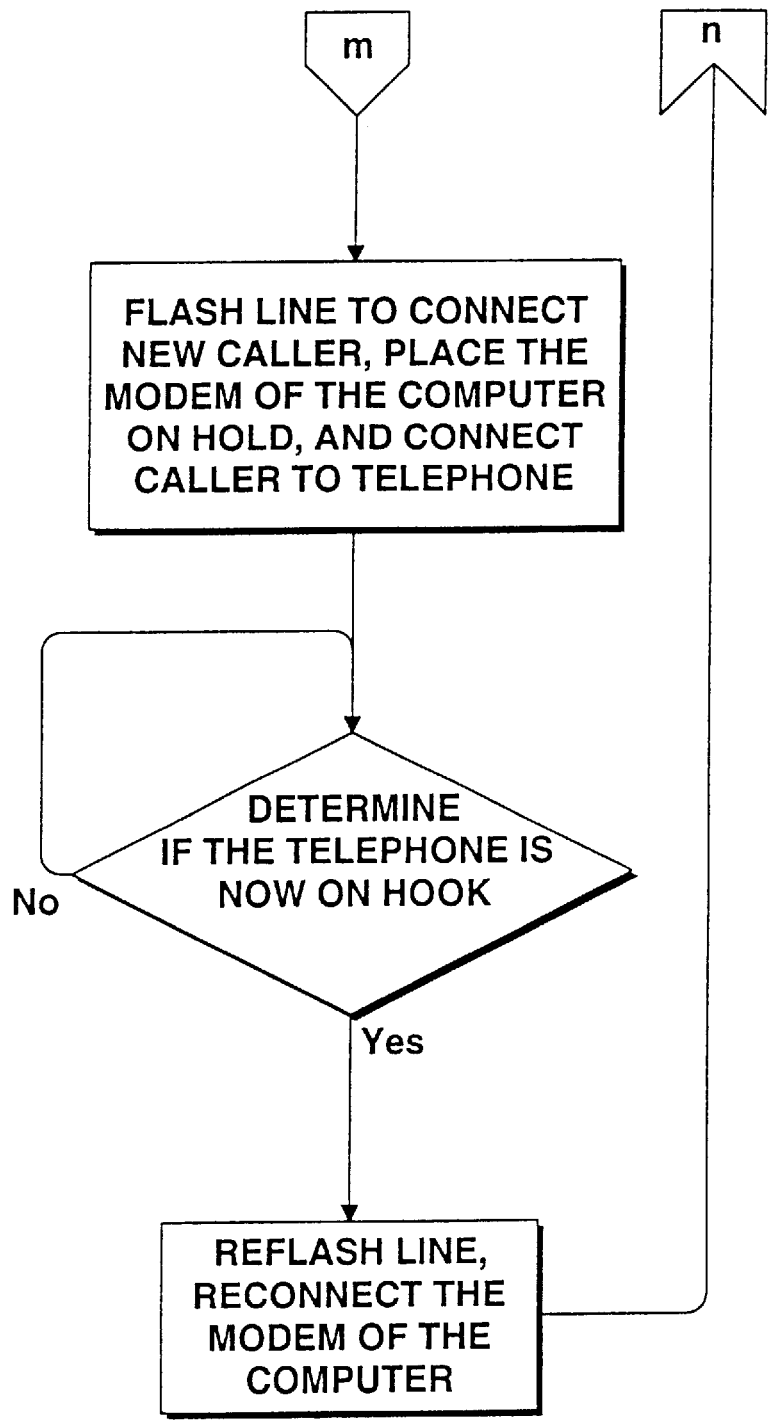
Figure 7A:
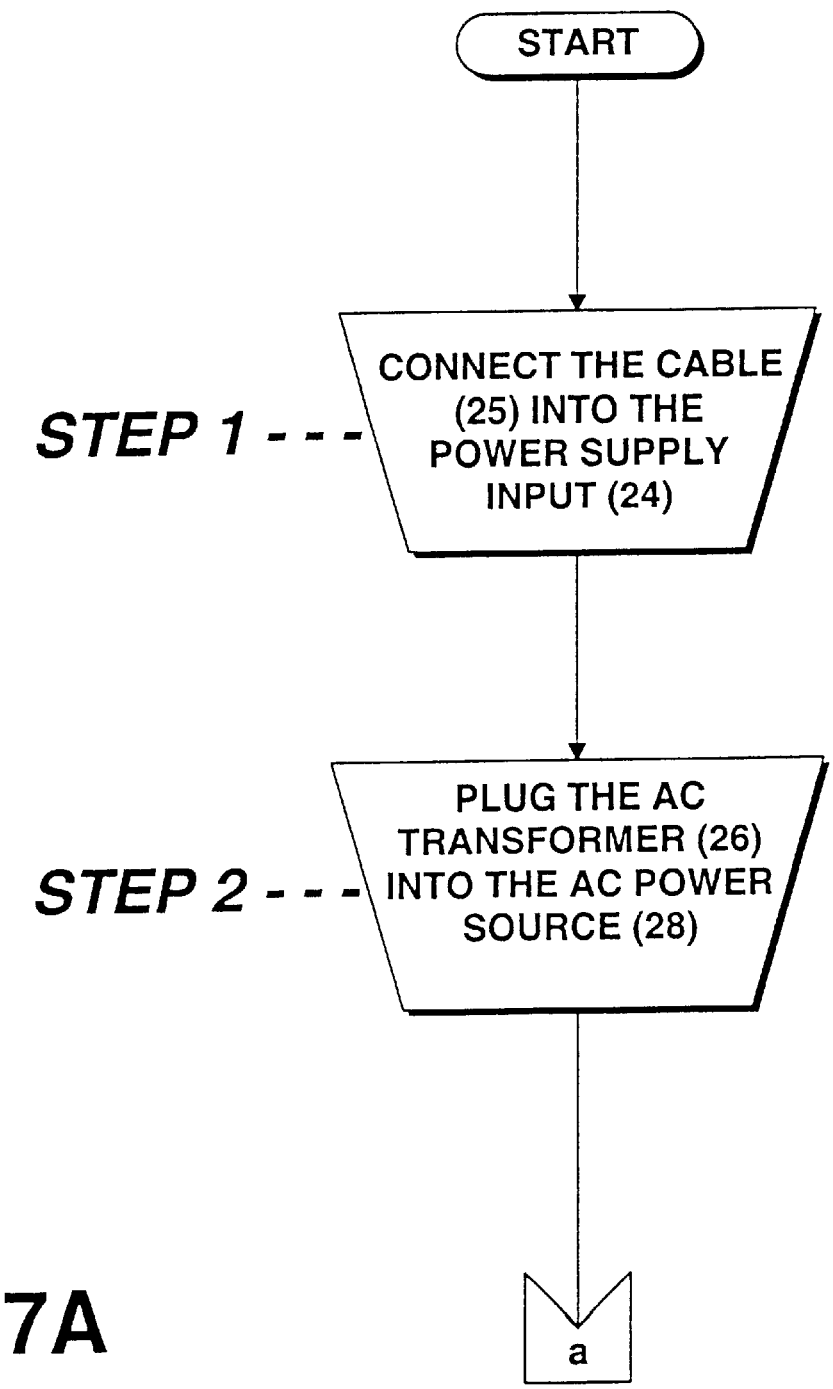
FIGS. 7A-7E are a flow chart of the method of installing the present invention.
Figure 7B:
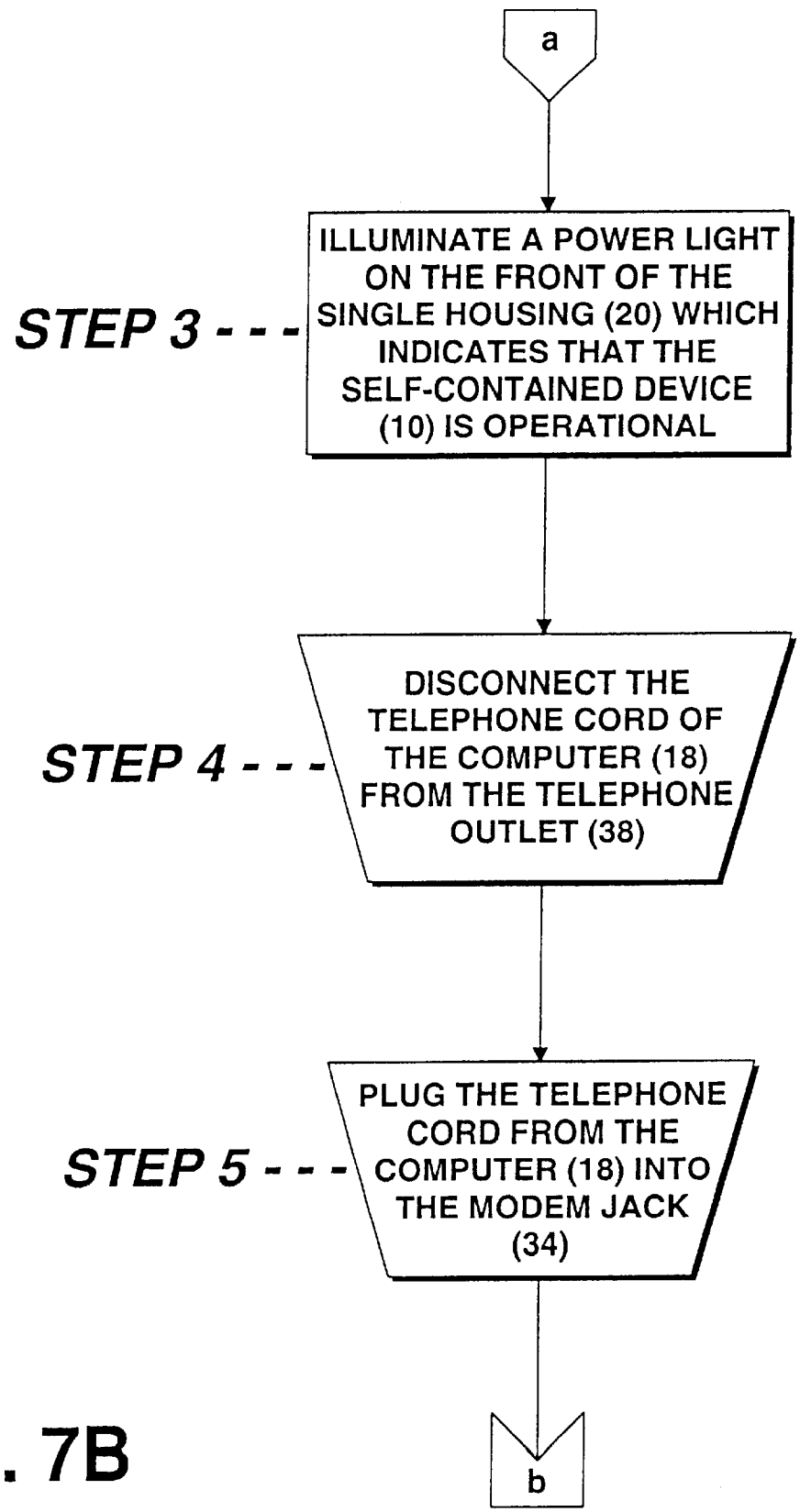
Figure 7C:
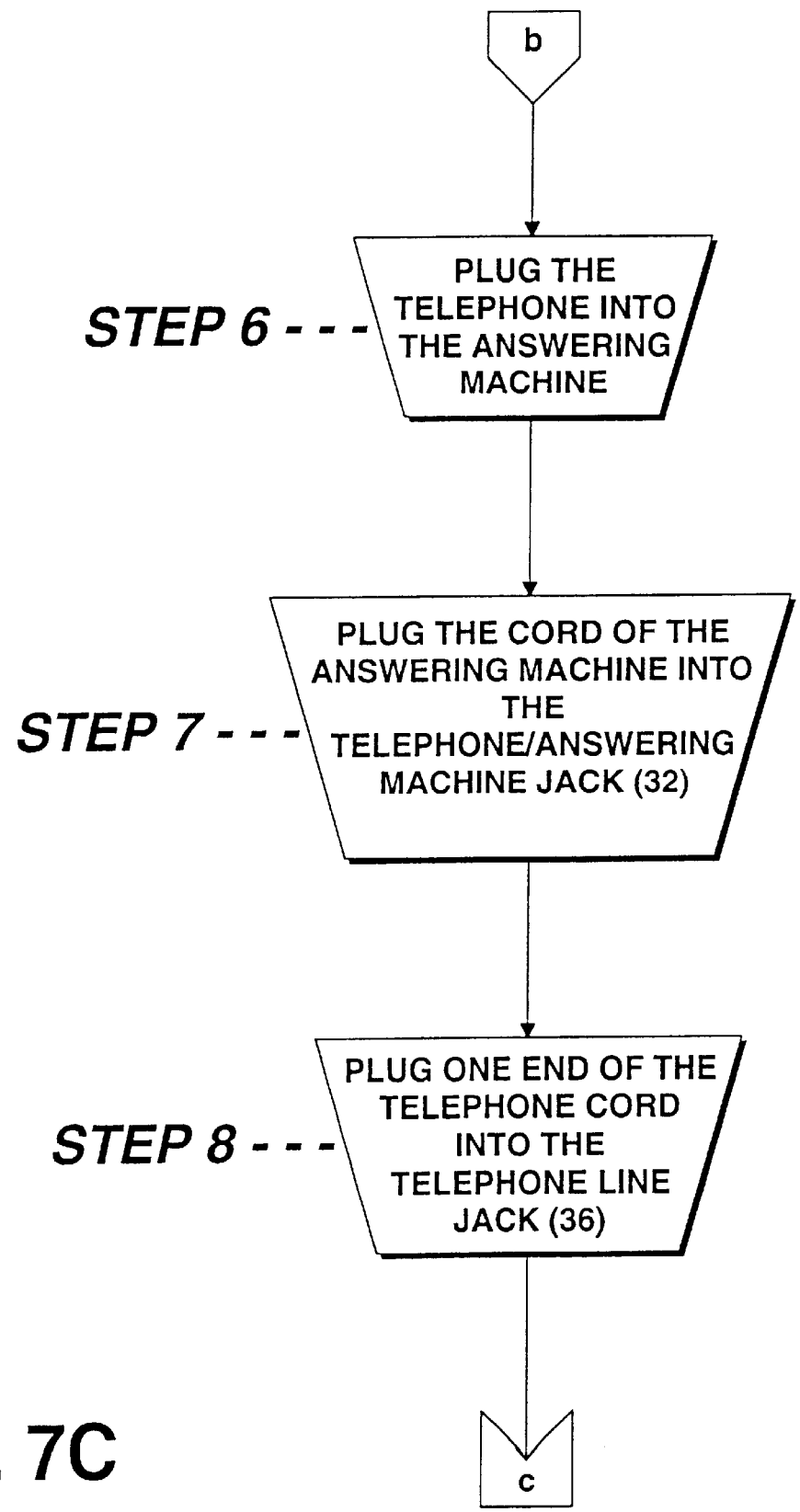
Figure 7D:
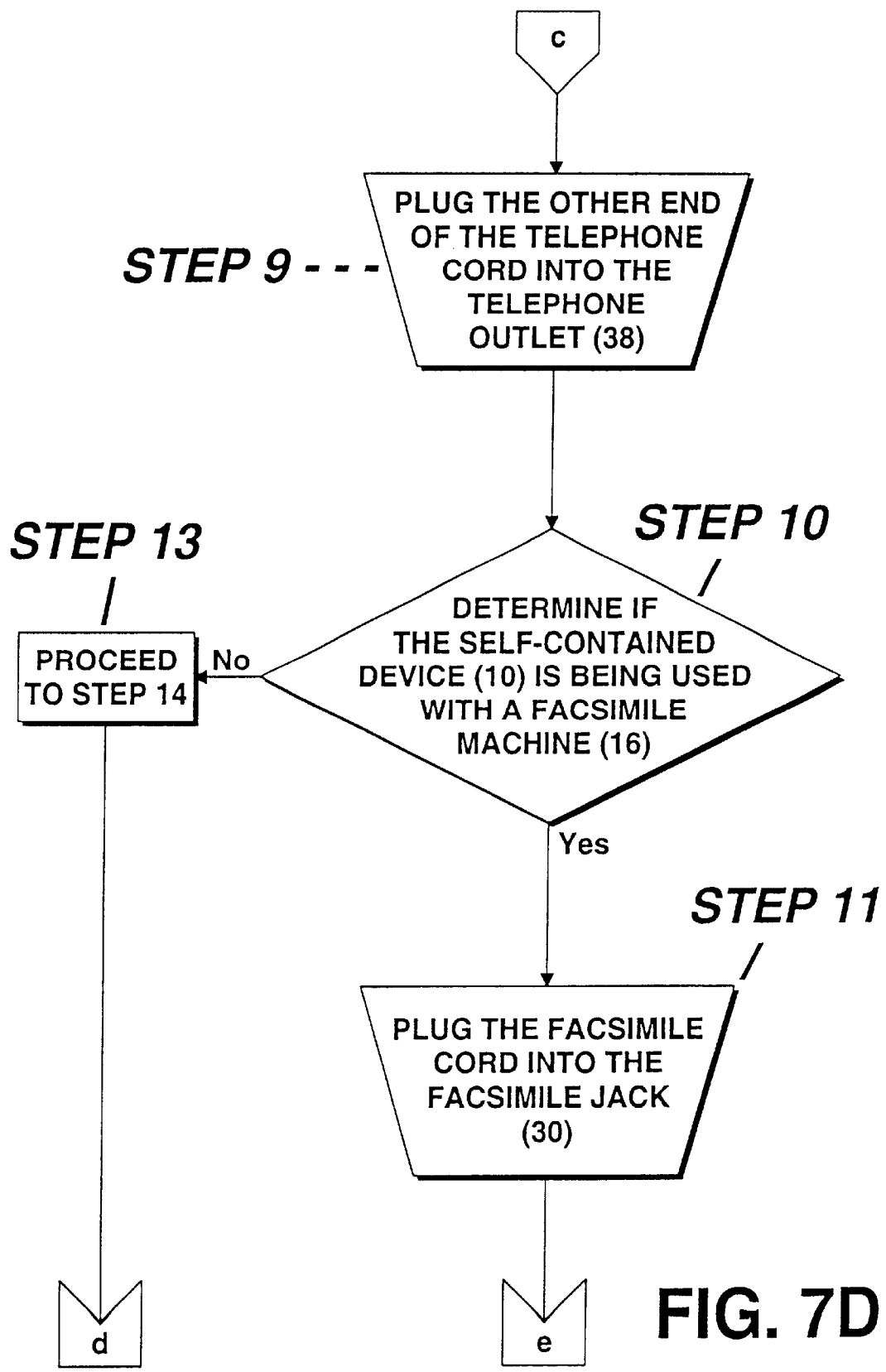
Figure 7E:
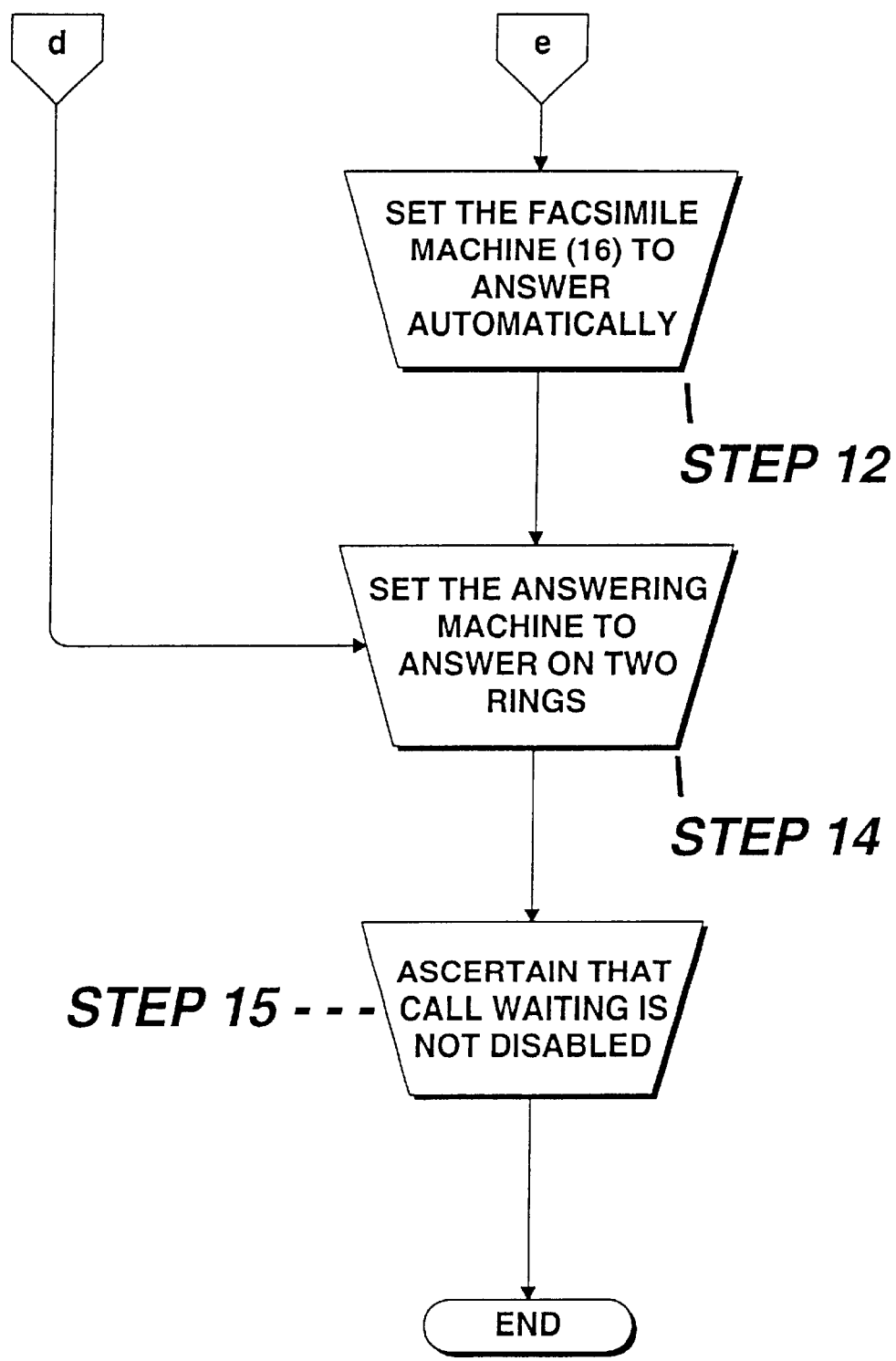

Referring now to FIG. 3, the method of use of distinctive ring will now be discussed. The steps in this process are as follows:

STEP 1: Action is initiated when self-contained device 10 detects a ring signal.

STEP 2: Filter 44c then identifies the specific distinctive ring of the ring signal.

STEP 3: Microprocessor 42 thereafter uses the distinctive ring signal to determine and display the recipient of the incoming call by means of the distinctive ring.

This basic process may be employed in any of the embodiments of the invention discussed below, at the step of detecting a ring signal and using display/ring buzzer 48 to convey the information regarding intended recipient to the user. The enhancements this offers will be further discussed in reference to each of the following embodiments.

In the preferred embodiment and best mode presently contemplated for carrying out the invention, microprocessor 42 will display using display 48 the distinctive ring signal. This signal may, in one embodiment, be a sequence of rings offered by the telephone service provider as part of the distinctive ring package. Such rings may be distinguished by length of ring, number of rings, pattern, length of silences within the rings, tone and/or other qualities. Display/buzzer 48 may have a visual component such as a light or LED which lights up (or "flashes", however, this use of the word "flash" should not be confused with the telephone control "flash" used to switch lines). Thus the LED or light provides the same ring information as the distinctive ring, for example by means of length of lighting up, number of flashes, pattern, length of periods between flashes, color and/or other qualities.

Ring buzzer 48 may be used in alternative embodiments either with the LED/light display or by itself. This buzzer may directly mimic the sounds produced by the distinctive ring signal itself, or it may provide other more easily distinguished patterns.

The distinctive ring information detected and recognized by the stand alone device 10 of the invention may be used in addition during the "determination" steps described below. In particular, the distinctive ring may be used in one alternative to route incoming calls automatically based on whether the distinctive ring identifies a call that is coming to a "facsimile recipient" or a "voice recipient" or a "modem recipient". This function may be carried out based upon information provided during the set-up of the device. In further particular, in yet another alternative embodiment the distinctive ring may be used to answer or ignore incoming calls based upon the distinctive ring and information provided during the set-up of the device.

Referring now to FIGS. 4A-4D, the method of use of the device will now be discussed.

STEP 1: Ascertain that the self-contained device 10 is connected to the AC power source 28 by illumination of a power light on the front of the single housing 20.

STEP 2: Log online.

STEP 3: Ascertain that the computer 18 is online by illumination of a modem light on the front of the single housing 20.

STEP 4: Ring and flash a call light when the self-contained device 10 detects a call waiting signal.

STEP 5: Determine if call is to be answered.

STEP 6: Lift the handset of the telephone connected to the self-contained device 10, if answer to STEP 5 is yes.

STEP 7: Flash automatically the telephone line 12 and connect to the caller, placing automatically the Internet provider on hold.

STEP 8: Hang up the telephone once finished with the call.

STEP 9: Reflash automatically the telephone line 12 and connect the computer 18 back to the Internet provider.

STEP 10: Determine if the service provider has logged off the computer 18. It is not unusual for the Internet service provider to disconnect within a short period.

STEP 11: Reconnect, if answer to STEP 10 is yes.

It will be seen that during STEP 4 of the method of FIG. 4, the distinctive ring may be employed either by the buzzer or by the call light to indicate to the user the identity of the intended recipient. During STEP 5, determination of whether the call should be answered or not, the user may profitably employ this information in manually determining whether or not to temporarily suspend the Internet session by means of the abilities offered by self-contained device 10. In this embodiment, the distinctive ring information is sent to the user by means of display/buzzer 48 in order to allow the user to make the decision how to handle the call.

There is an additional use of the distinctive ring made possible by the invention. The handling of the incoming call may be determined automatically based upon the identity of the intended recipient. For example, the user may program the device during set-up so as to automatically suspend Internet access in accordance with the invention when the distinctive ring identifies an incoming call as being intended for a business recipient, however, the self-contained device 10 may automatically ignore the incoming call if intended for a family-member's personal reception, and may request user input in the determination if the incoming call is intended for a facsimile reception.

The method of operation of the self-contained device 10 when used with the facsimile machine 16 can best be seen in FIGS. 5A-5B and 6A-6G, and as such, will be discussed with reference thereto. Note that in the following embodiment of FIG. 5, the distinctive ring signal may be used to provide users with call recipient information, even though the routing of fax versus voice recipients (discussed in reference to FIG. 4) may not be utilized.

STEP 1: Listen for a fax tone any time there is an incoming call regardless if the incoming call is answered by either picking up the telephone, the answering machine, or in a call waiting call.

STEP 2: Determine if the incoming call is a voice.

STEP 3: Ignore the incoming call, if answer to STEP 2 is yes.

STEP 4: Determine if the incoming call is a fax, if answer to STEP 2 is no.

STEP 5: Ring immediately the facsimile machine 16, if answer to STEP 4 is yes.

STEP 6: Transfer the incoming call to the facsimile machine 16, if STEP 5 is carried out.

The method of installing the self-contained device 10 can best be seen in FIGS. 7A-7E, and as such, will be discussed with reference thereto.

STEP 1: Connect the cable 25 into the power supply input 24.

STEP 2: Plug the AC transformer 26 into the AC power source 28.

STEP 3: Illuminate a power light on the front of the single housing 20, which indicates that the self-contained device 10 is operational.

STEP 4: Disconnect the telephone cord of the computer 18 from the telephone outlet 38.

STEP 5: Plug the telephone cord from the computer 18 into the modem jack 34.

STEP 6: Plug the telephone into the answering machine.

STEP 7: Plug the cord of the answering machine into the telephone/answering machine jack 32.

STEP 8: Plug one end of the telephone cord into the telephone line jack 36.

STEP 9: Plug the other end of the telephone cord into the telephone outlet 38.

STEP 10: Determine if the self-contained device 10 is being used with a facsimile machine 16.

STEP 11: Plug the facsimile cord into the facsimile jack 30 if answer to STEP 10 is yes.

STEP 12: Set the facsimile machine 16 to answer automatically and proceed to STEP 14, if STEP 11 is carried out. The facsimile machine 16 will only respond to an incoming call when the self-contained device 10 transfers the incoming call to the facsimile machine 16. The facsimile machine 16 will no longer answer when the telephone rings.

STEP 13: Proceed to step 14, if answer to STEP 10 is no.
STEP 14: Set the answering machine to answer on two rings.
STEP 15: Ascertain that call waiting is not disabled.

Figure 8A:
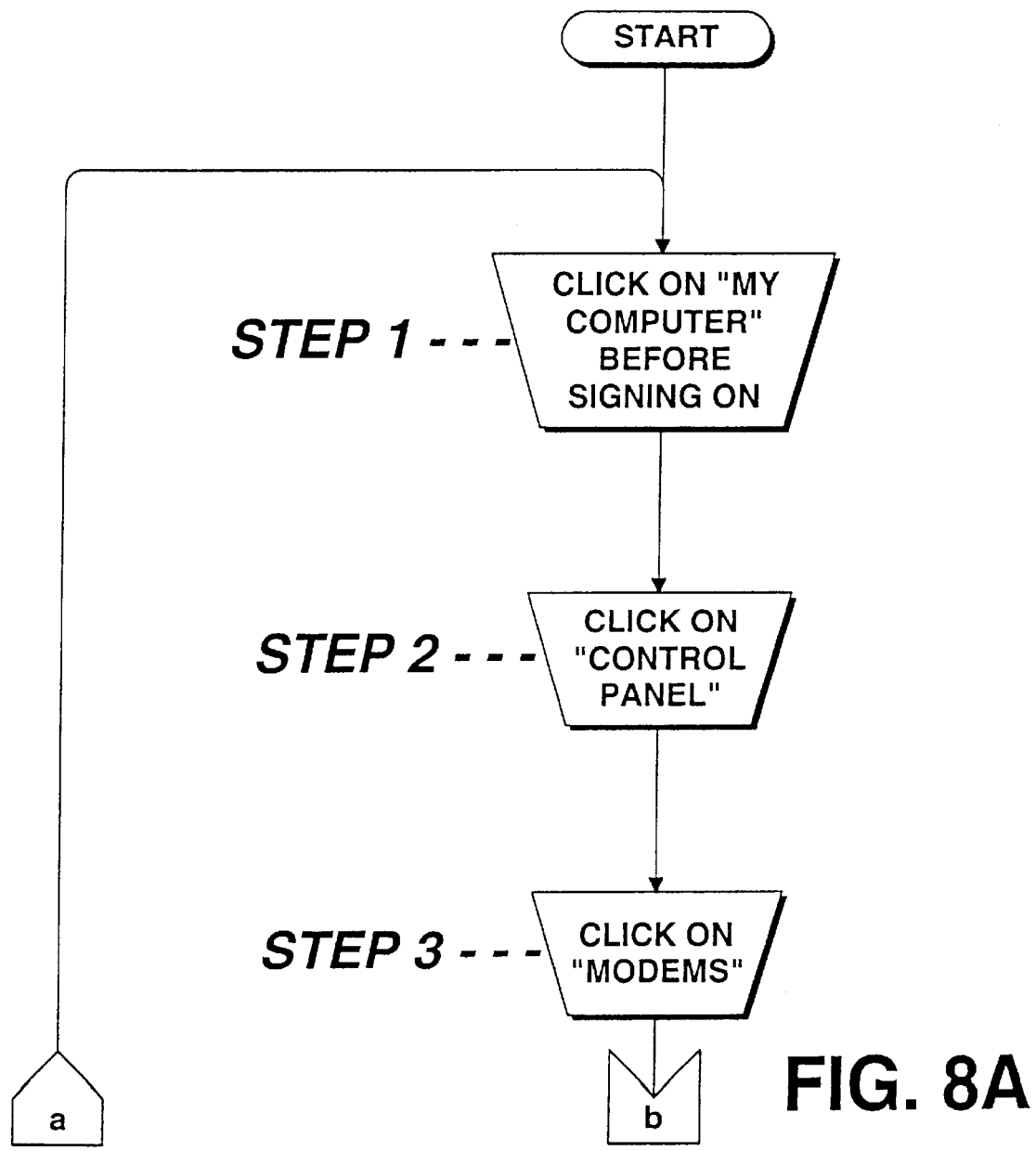
FIGS. 8A-8C are a flow chart of the method of ascertaining that call waiting is not disabled for window users.
Figure 8B:
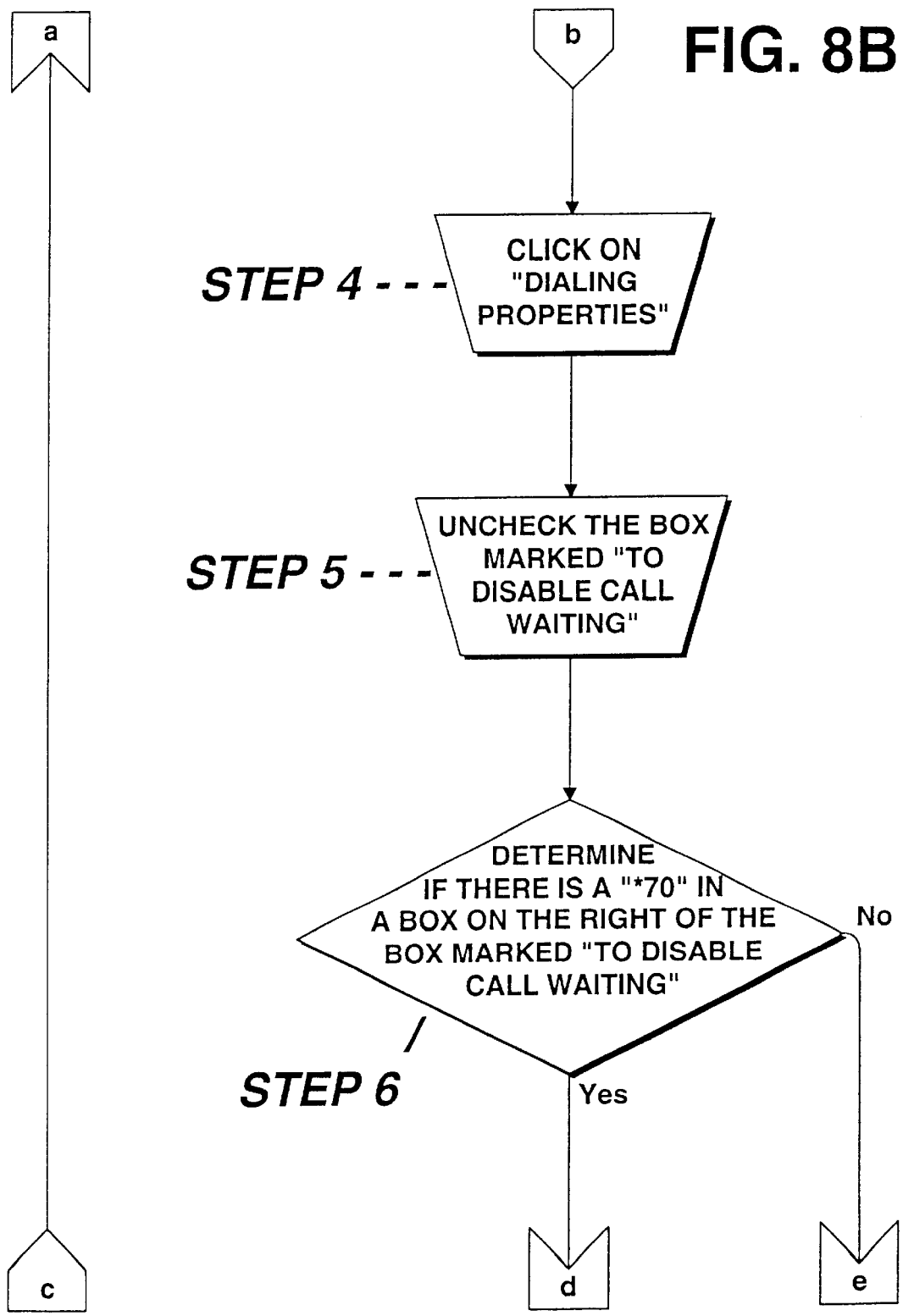
Figure 8C:
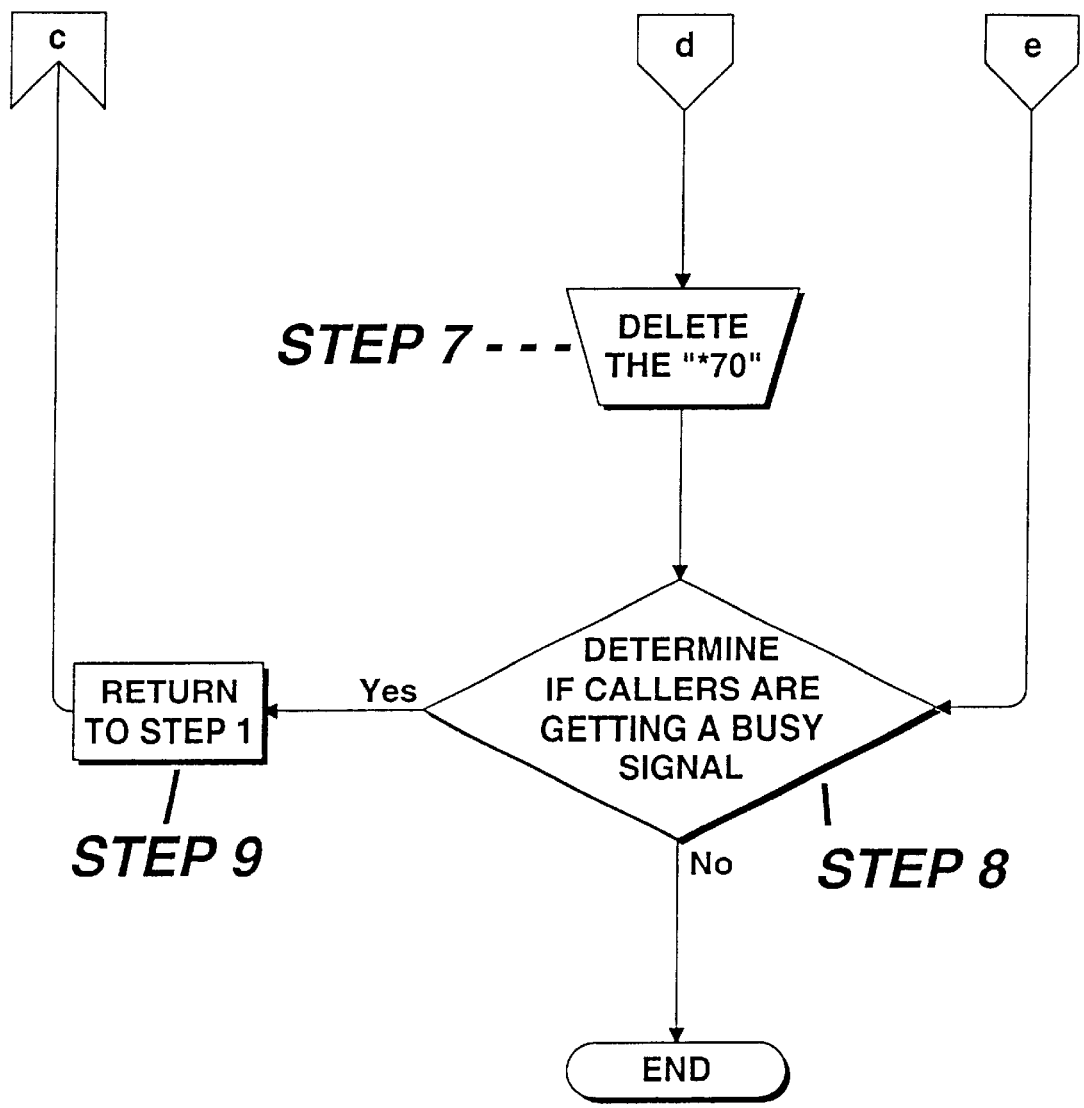

The method of ascertaining that call waiting is not disabled for window users can best be seen in FIGS. 8A-8C, and as such, will be discussed with reference thereto.
STEP 1: Click on "my computer" before signing on.
STEP 2: Click on "control panel".
STEP 3: Click on "modems".
STEP 4: Click on "dialing properties".
STEP 5: Uncheck the box marked "to disable call waiting".
STEP 6: Determine if there is a "*70" in a box on the right of the box marked "to disable call waiting".
STEP 7: Delete the "*70", if answer to STEP 6 is yes. There may also be a telephone icon on the control panel with the same check box.
STEP 8: Determine if callers are getting a busy signal.
STEP 9: Return to STEP 1, if answer to STEP 8 is yes.

Figure 9A:
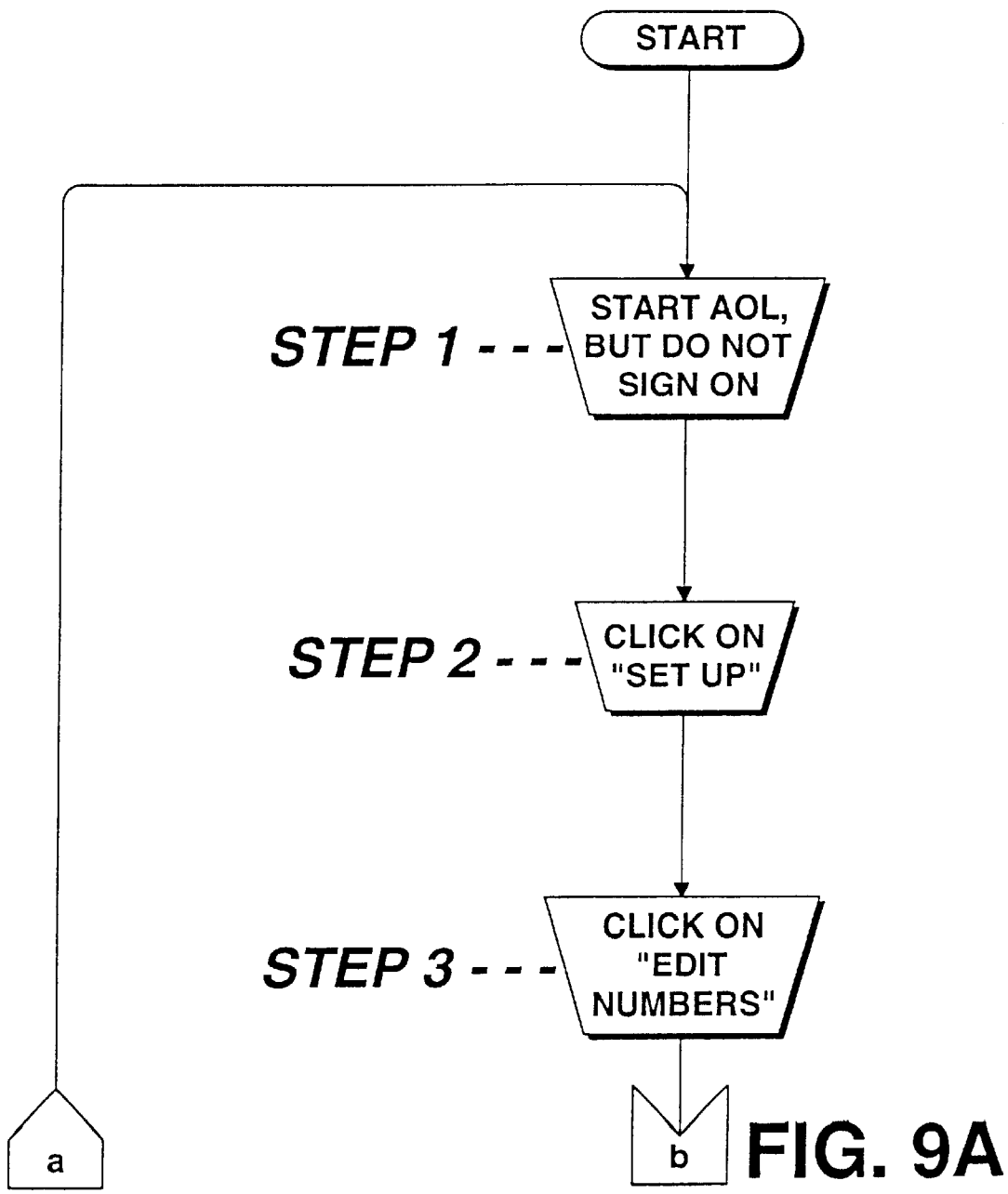
FIGS. 9A-9B are a flow chart of the method of ascertaining that calling waiting is not disabled for America-On-Line (AOL) users.
Figure 9B:
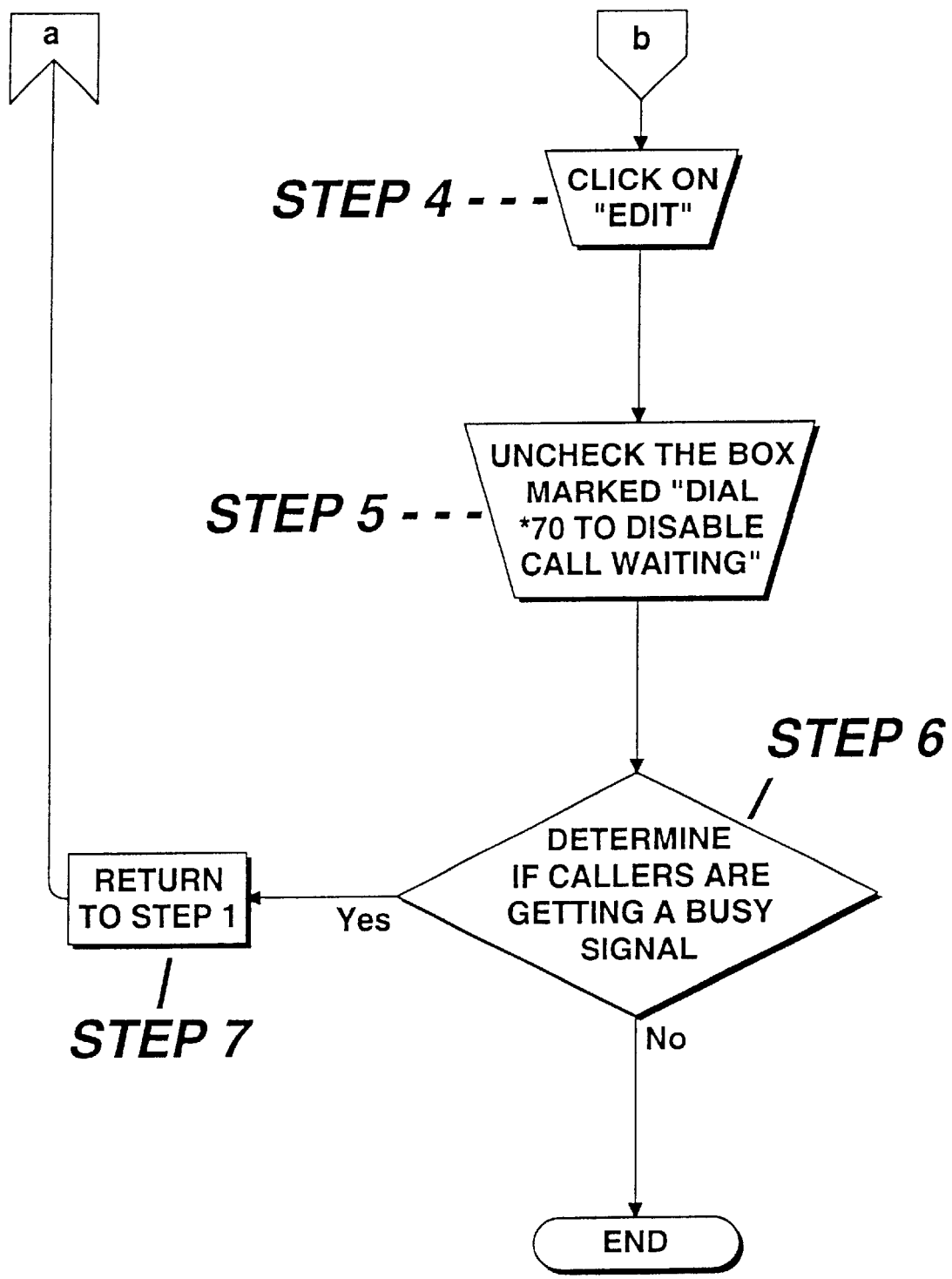

The method of ascertaining that calling waiting is not disabled for AOL users can best be seen in FIGS. 9A-9B, and as such, will be discussed with reference thereto.
STEP 1: Start AOL, but do not sign on.
STEP 2: Click on "set up".
STEP 3: Click on "edit numbers".
STEP 4: Click on "edit".
STEP 5: Uncheck the box marked "dial *70 to disable call waiting".
STEP 6: Determine if callers are getting a busy signal.
STEP 7: Return to STEP 1, if answer to STEP 6 is yes.

Figure 10A:
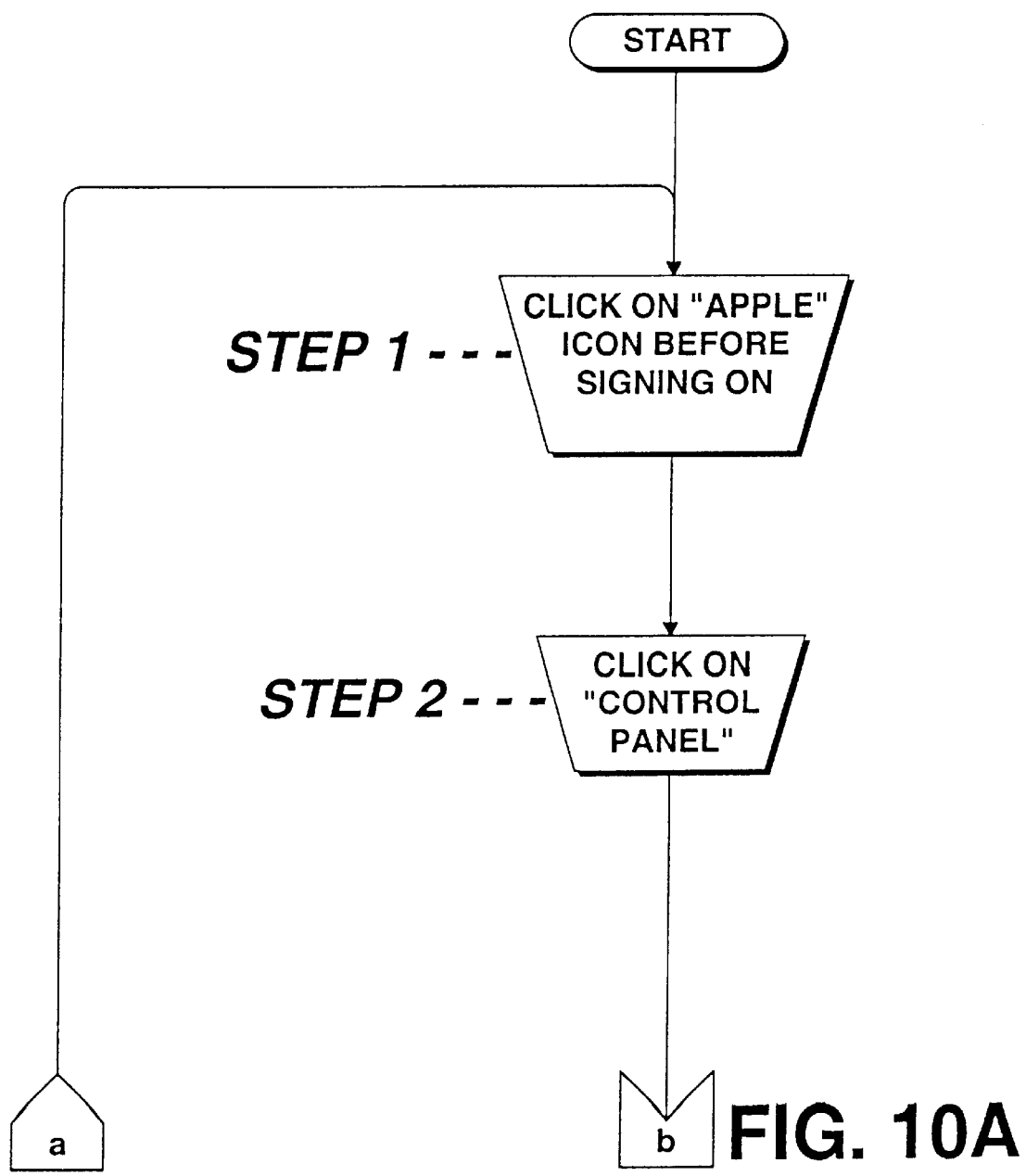
FIGS. 10A-10B are a flow chart of the method for ascertaining that call waiting is not disabled for Macintosh Computer (MAC) users.
Figure 10B:
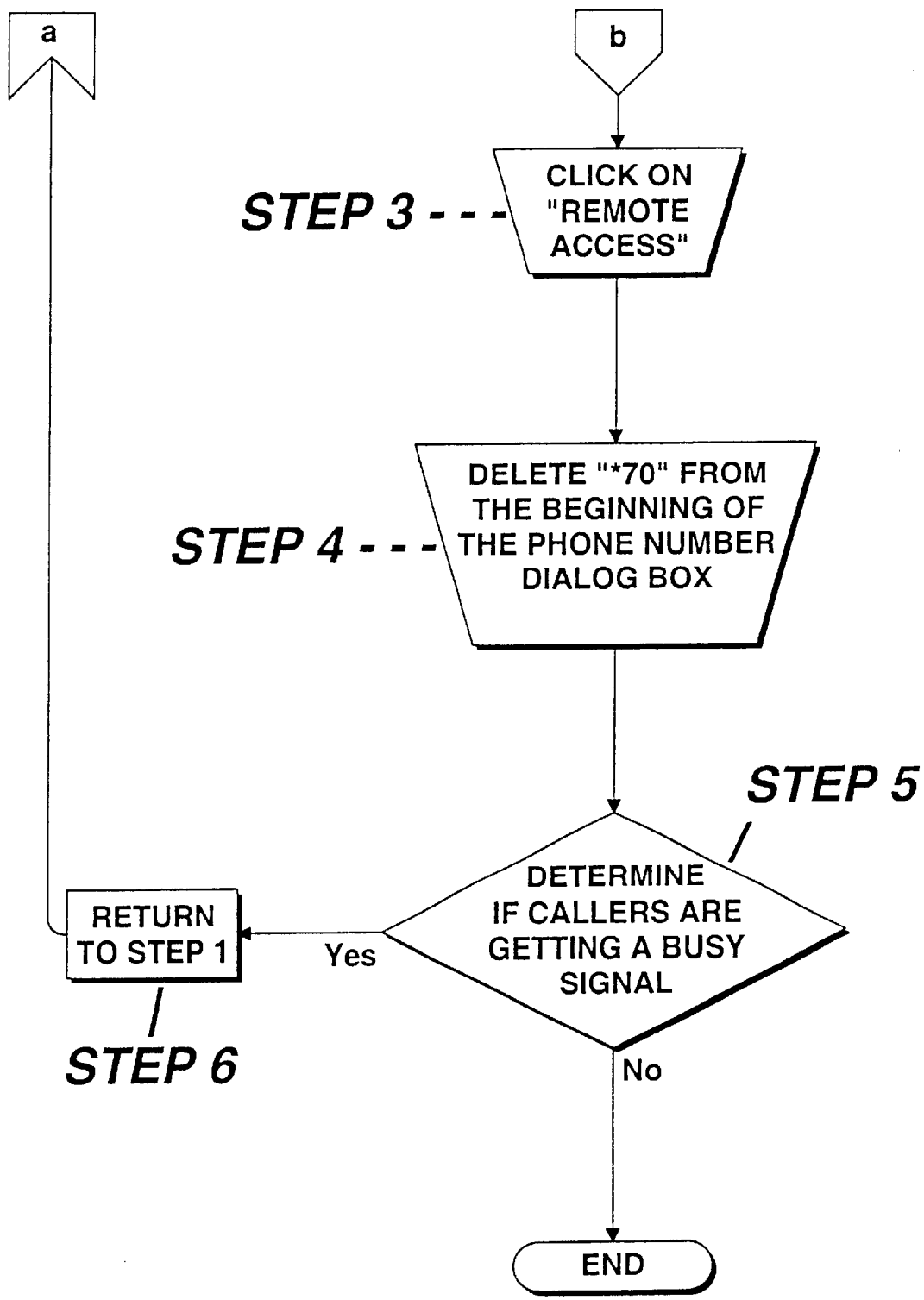
Figure 11A:
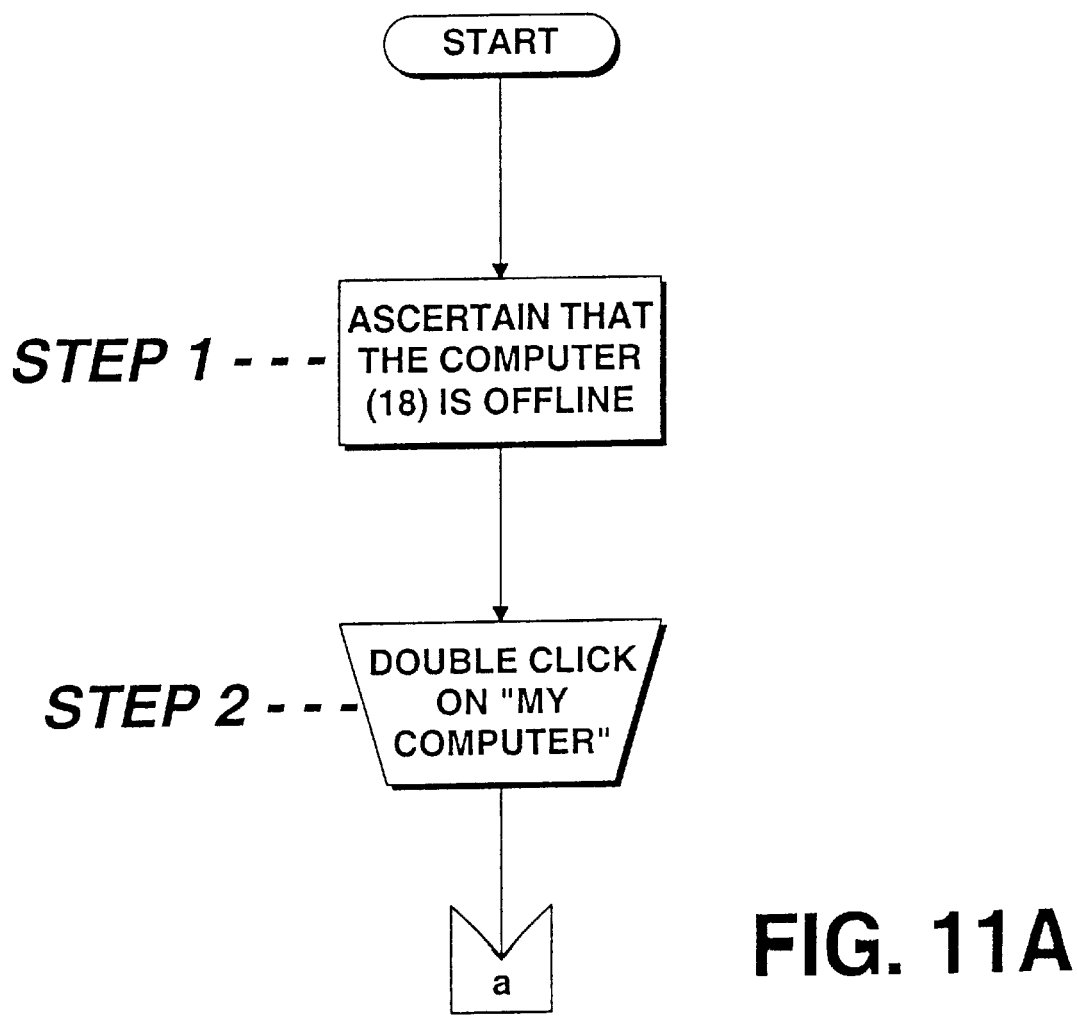
FIGS. 11A-11D are a flow chart of the method of making the present invention work better with the computer if the computer disconnects as soon as the telephone/answering machine rings or as soon as the telephone/answering machine is answered.
Figure 11B:
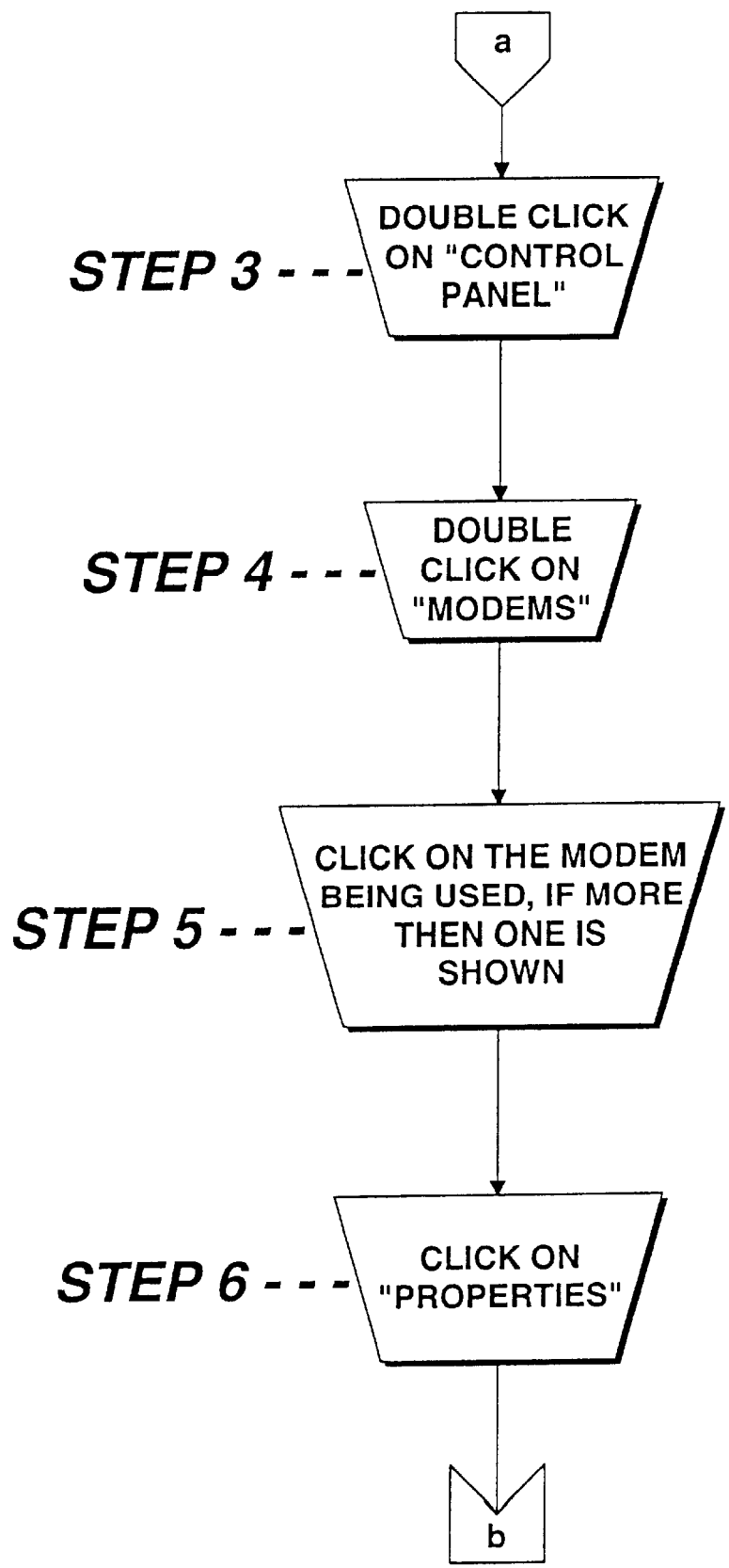
Figure 11C:
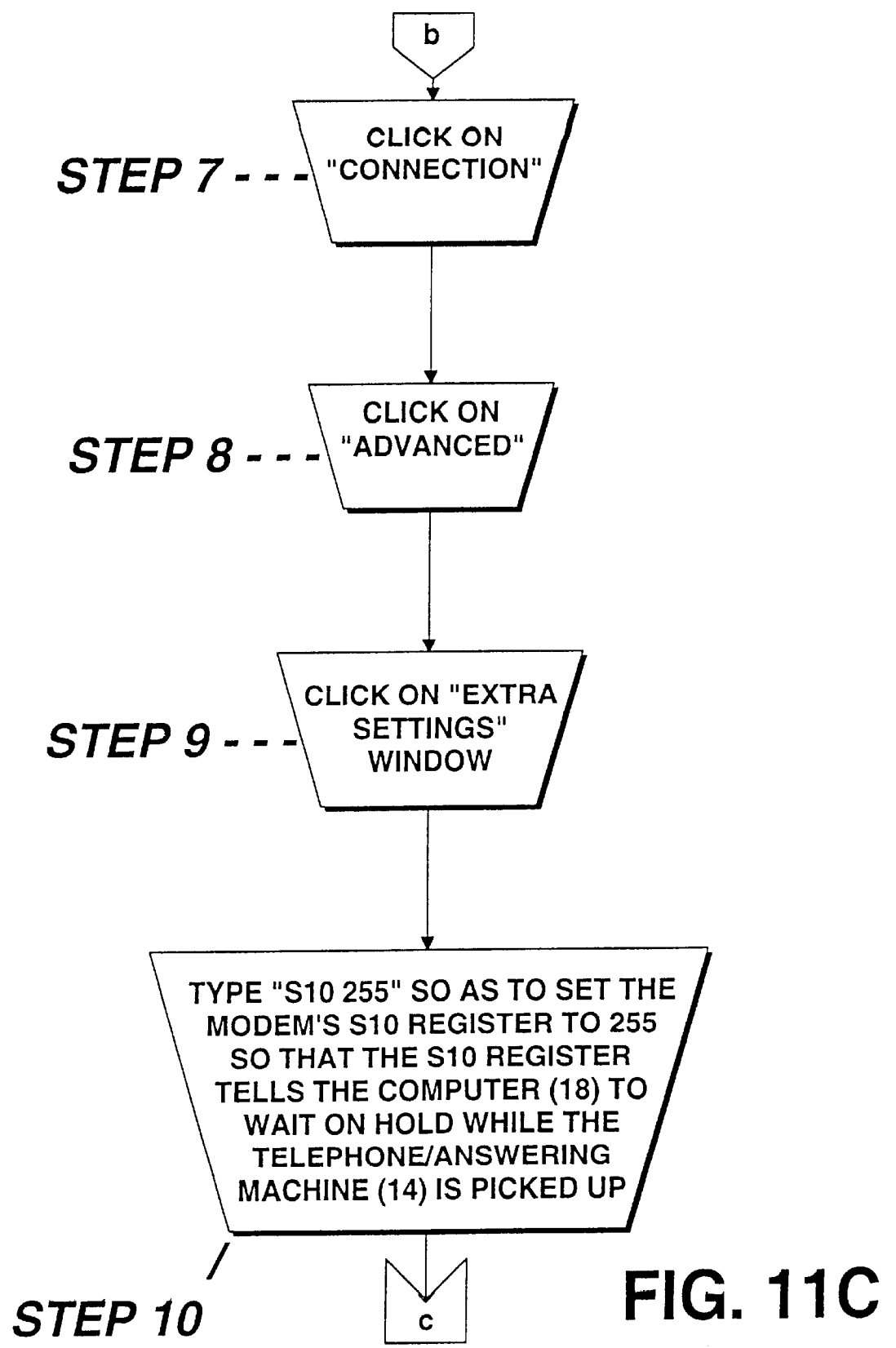
Figure 11D:
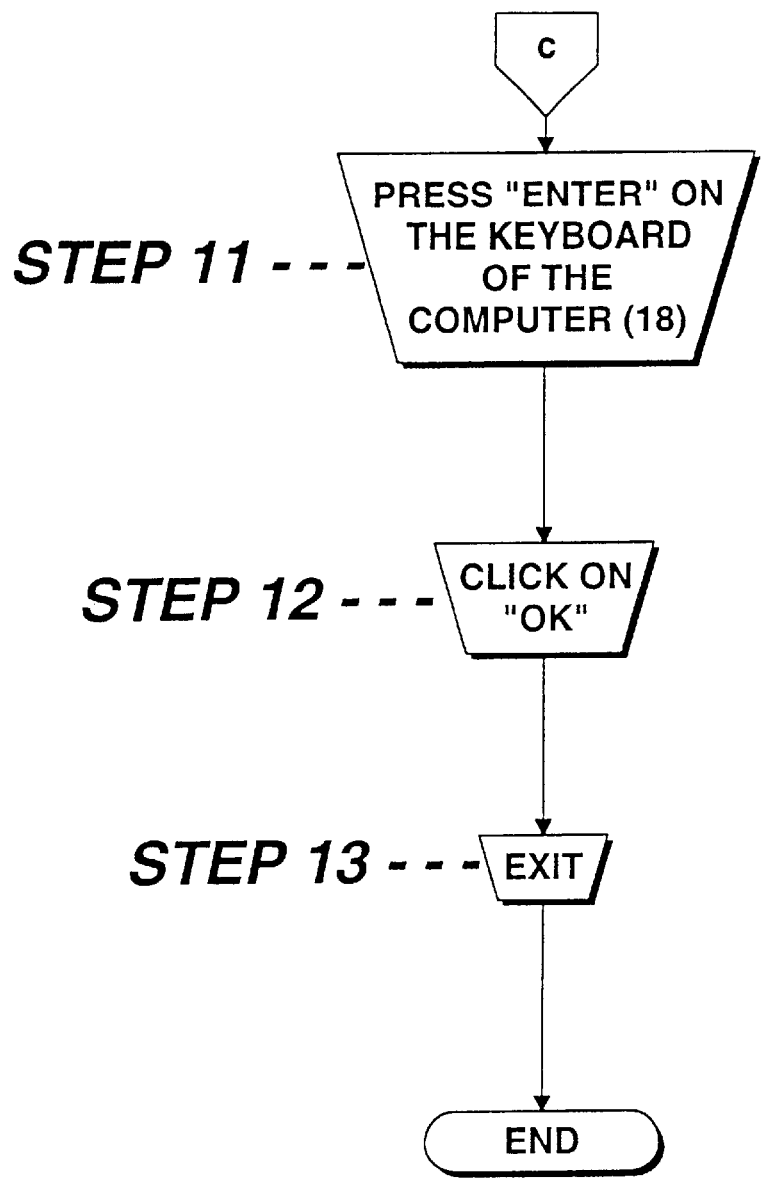

The method for ascertaining that call waiting is not disabled for MAC users can best be seen in FIGS. 10A-10B, and as such, will be discussed with reference thereto.
STEP 1: Click on the apple icon before signing on.
STEP 2: Click on "control panel".
STEP 3: Click on "remote access".
STEP 4: Delete "*70" from the beginning of the phone number dialog box.
STEP 5: Determine if callers are getting a busy signal.
STEP 6: Return to STEP 1, if answer to STEP 5 is yes.

The method of making the self-contained device 10 work better with the computer 18 if the computer 18 disconnects as soon as the telephone/answering machine 14 rings or as soon as the telephone/answering machine 14 is answered can best be seen in FIGS. 11A-11D, and as such, will be discussed with reference thereto.
STEP 1: Ascertain that the computer 18 is offline.
STEP 2: Double click on "my computer".
STEP 3: Double click on "control panel".
STEP 4: Double click on "modems".
STEP 5: Click on the modem being used, if more then one is shown.
STEP 6: Click on "properties".
STEP 7: Click on "connection".
STEP 8: Click on "advanced".
STEP 9: Click on "extra settings" window.
STEP 10: Type "S10 255" so as to set the modems S10 register to 255 so that the S10 register tells the computer 18 to wait on hold while the telephone/answering machine 14 is picked up.
STEP 11: Press "enter" on the keyboard of the computer 18.
STEP 12: Click on "OK".
STEP 13: Exit.

During set-up of certain alternative embodiments of the invention, the user may in addition wish to direct the invention as to handling of incoming calls based upon recipient identity. Thus, the "Internet suspension" operation, STEP 7 of FIG. 4 may be enabled in certain cases and not in others, while the set-up operations of the self-contained device 10 may direct the methods of ringing/flashing the buzzer/call light 38 during STEP 4 of FIG. 4. In addition, STEP 5 of FIG. 4, in which the determination as to whether a call is to be answered or not is made, may be designated automatically based upon the distinctive ring signal received.

This additional set-up may be carried out in hardware (for example, by means of buttons on the self-contained unit 10) or may be carried out by means of software on a personal computer, with the settings generated by the personal computer then downloaded to the self-contained device 10. Note that the setting information may then be present in self-contained device 10 even when a computer is turned off, disconnected, broken or otherwise unavailable during an incoming call. This facet of the self-contained operation is felt to be a marked improvement over devices teaching use of a personal computer to handle incoming distinctive ring information.

The disclosure is provided to allow practice of the invention by those skilled in the art without undue experimentation, including the best mode presently contemplated and the presently preferred embodiment. Nothing in this disclosure is to be taken to limit the scope of the invention, which is susceptible to numerous alterations, equivalents and substitutions without departing from the scope and spirit of the invention. The scope of the invention is to be understood from the appended claims.

What is claimed is:

1. A self-contained device for using a single telephone line to receive telephone calls and facsimile messages for transmission respectively to a telephone/answering machine and a facsimile machine while being simultaneously connectable to the Internet by a computer having a modem, said device comprising:
   a) a single housing having a wall and a microprocessor;
   b) a facsimile jack located on the wall of the single housing;
   c) a telephone/answering machine jack located on the wall of the single housing;
   d) a modem jack located on the wall of the single housing;
   e) a telephone line jack located on the wall of the single housing, the self contained device able to flash such single telephone line via the telephone line jack, thereby placing a call on hold;
   f) a distinctive ring filter able to identify the recipient of a distinctive ring signal;
   g) a display located on the single housing; the display being operatively connected to and controlled by the filter.

2. The device of claim 1, wherein the filter uses digital signal processing to analyze the distinctive rings.

3. The device of claim 1, wherein the filter uses fuzzy logic to analyze the distinctive rings.

4. The device of claim 1, wherein the filter uses look up tables to analyze the distinctive rings.

5. The device of claim 1, wherein the display is operatively connected to the micro-processor, and wherein the distinctive ring filter conveys distinctive ring information to the micro-processor, and wherein the filter is operatively connected to and controlled by the micro-processor.

6. The device of claim 1, further comprising:
   h) a power supply having an input, a cable and an AC transformer adapted to connect to an AC power source.

7. The device of claim 6, wherein said power supply further has a 5 volt voltage regulator.

8. The device of claim 1, further comprising one member selected from the group consisting of:
 1) at least one tone detector in communication with the micro-processor and having a fax tone detector;
 2) at least one tone detector having selectable frequency capability for receiving tones of different frequencies;
 3) at least one telephone line isolation, amplification and filtration device located within the single housing; and
 4) combinations thereof.

9. The device of claim 1, wherein the display comprises at least one member selected from the group consisting of:
 1) a buzzer;
 2) a light;
 3) an LED; and
 4) combinations thereof.

10. The device of claim 1, wherein the micro-processor responds to receipt of distinctive rings by automatically handling an incoming call.

11. The device of claim 10, wherein the automatic handling of the incoming call comprises one member selected from the group consisting of:
 1) suspending Internet access;
 2) routing the call to a facsimile machine;
 3) routing the call to a telephone/answering machine;
 4) sending to the user the distinctive ring information in order to allow the user to manually determine handling of the call;
 5) ignoring the call;
 6) routing the call to a modem; and
 7) combinations thereof.

12. A method of receiving a distinctive ring using a stand alone device having a facsimile jack and having a telephone jack, the method comprising the steps of:
 1) accessing a service provider by means of a telephone line having the distinctive ring feature;
 2) monitoring the telephone line using a stand alone device;
 3) upon receipt of a distinctive call waiting tone, carrying out the following steps 4 through 7 inclusive:
 4) identifying the distinctive call waiting tone;
 5) determining and sounding/displaying the distinctive ring pattern;
 6) determining if a call is to be answered;
 7) if the call is to be answered, carrying out the following steps 8 through 10 inclusive:
 8) flashing the telephone line, thereby automatically placing the service provider on hold and connecting to the caller;
 9) monitoring the telephone line using the stand alone device;
 9a) determine if the incoming call is a fax or voice call;
 9b) if the incoming call is a fax, transfer the incoming call to the facsimile machine using the facsimile jack;
 9c) if the incoming call is a voice call, transfer the incoming call to the telephone line using the telephone jack;
 9d) monitoring the telephone line using the stand alone device until the telephone is hung up; and
 10) flashing the telephone line, thereby automatically connecting to the service provider.

13. The method of claim 12, further comprising the steps of:
 11) determining if the service provider has logged off of the computer; and
 12) reconnecting to the service provider.

14. The method of claim 12, wherein the step of determining and sounding/displaying the distinctive ring signal further comprises use of digital signal processing.

15. The method of claim 12, wherein the step of determining and sounding/displaying the distinctive ring signal further comprises use of a look up table.

16. The method of claim 12, wherein the step of determining and sounding/displaying the distinctive ring signal further comprises use of fuzzy logic.

17. The method of claim 12, wherein the step of determining if a call is to be answered further comprises one member selected from the group consisting of: manually determining if the call is to be answered by awaiting user input, automatically determining if the call is to be answered by consulting information provided during the set-up of the device.

* * * * *